(12) United States Patent
Patrick et al.

(10) Patent No.: US 10,986,375 B2
(45) Date of Patent: *Apr. 20, 2021

(54) SYSTEMS AND METHODS AUTOMATICALLY ERASING CONTENT STORED ON A SET TOP BOX

(71) Applicant: Hotel Internet Services, LLC., Clearwater, FL (US)

(72) Inventors: Gary Lane Patrick, Belleair, FL (US); Ran Grumer, Sunnyvale, FL (US)

(73) Assignee: Hotel Internet Services, LLC, Clearwater, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/152,402

(22) Filed: Oct. 4, 2018

(65) Prior Publication Data
US 2019/0037253 A1 Jan. 31, 2019

Related U.S. Application Data

(63) Continuation of application No. 15/257,256, filed on Sep. 6, 2016, now Pat. No. 10,097,864.

(Continued)

(51) Int. Cl.
*H04N 21/214* (2011.01)
*H04N 21/45* (2011.01)
(Continued)

(52) U.S. Cl.
CPC ... *H04N 21/2143* (2013.01); *H04N 21/23113* (2013.01); *H04N 21/25816* (2013.01);
(Continued)

(58) Field of Classification Search
None
See application file for complete search history.

(56) References Cited

U.S. PATENT DOCUMENTS

| 7,185,282 B1 | 2/2007 | Naidoo et al. |
| 2007/0157242 A1 | 7/2007 | Cordray et al. |

(Continued)

OTHER PUBLICATIONS

Final Office Action on U.S. Appl. No. 15/257,256 dated Mar. 2, 2018 (39 pages).

(Continued)

*Primary Examiner* — Jason K Lin
(74) *Attorney, Agent, or Firm* — Foley & Lardner LLP

(57) ABSTRACT

Systems and methods for erasing content stored on a set top box via a dedicated input object of a remote input device are described. A set top box (STB) receives a request to activate the set top box. The STB can create a storage location to which the STB is configured to store identifiers and passwords of a guest. The STB stores one or more user identifiers and passwords of the guest that correspond to one of one or more applications or web services accessed via the device. The STB receives, from a remote control device via a wireless communication, a command to delete the user identifiers and passwords stored on the STB responsive to selection of a delete button on the remote control device. An agent executing on the STB can delete the one or more user identifiers and passwords from the STB responsive to receipt of the command.

20 Claims, 35 Drawing Sheets

Related U.S. Application Data

(60) Provisional application No. 62/273,916, filed on Dec. 31, 2015.

(51) Int. Cl.

| | |
|---|---|
| *H04N 21/475* | (2011.01) |
| *H04N 21/4227* | (2011.01) |
| *H04N 21/414* | (2011.01) |
| *H04N 21/41* | (2011.01) |
| *H04N 21/258* | (2011.01) |
| *H04N 21/231* | (2011.01) |
| *H04N 21/4335* | (2011.01) |
| *H04N 21/2543* | (2011.01) |

(52) U.S. Cl.
CPC . *H04N 21/25833* (2013.01); *H04N 21/25875* (2013.01); *H04N 21/4126* (2013.01); *H04N 21/41407* (2013.01); *H04N 21/4227* (2013.01); *H04N 21/4335* (2013.01); *H04N 21/4532* (2013.01); *H04N 21/4753* (2013.01); *H04N 21/2543* (2013.01)

(56) References Cited

U.S. PATENT DOCUMENTS

| | | |
|---|---|---|
| 2007/0256126 A1 | 11/2007 | Erickson et al. |
| 2010/0008291 A1 | 1/2010 | Leblanc et al. |
| 2012/0117620 A1 | 5/2012 | Cassidy et al. |
| 2012/0262371 A1* | 10/2012 | Lee ................... H04N 21/485 345/157 |
| 2013/0088650 A1 | 4/2013 | Rouady et al. |
| 2013/0111522 A1 | 5/2013 | Tatem et al. |
| 2013/0340034 A1* | 12/2013 | Rich ..................... G06F 21/74 726/1 |
| 2013/0347025 A1* | 12/2013 | Prakash ............. H04N 21/4227 725/25 |
| 2015/0200923 A1 | 7/2015 | Triplett |
| 2015/0201223 A1* | 7/2015 | Osorio ............... H04N 21/2183 725/82 |
| 2016/0142765 A1* | 5/2016 | Ogle ................. H04N 21/42203 725/38 |
| 2016/0149891 A1 | 5/2016 | Kuper et al. |
| 2016/0192011 A1* | 6/2016 | Toh ..................... G06F 3/0481 725/37 |
| 2016/0198214 A1* | 7/2016 | Levy ................. H04N 21/4316 725/43 |

OTHER PUBLICATIONS

Notice of Allowance on U.S. Appl. No. 15/257,256 dated Jul. 26, 2018 (9 pages).

U.S. Office Action on U.S. Appl. No. 15/257,256 dated Jun. 16, 2017 (24 pages).

\* cited by examiner

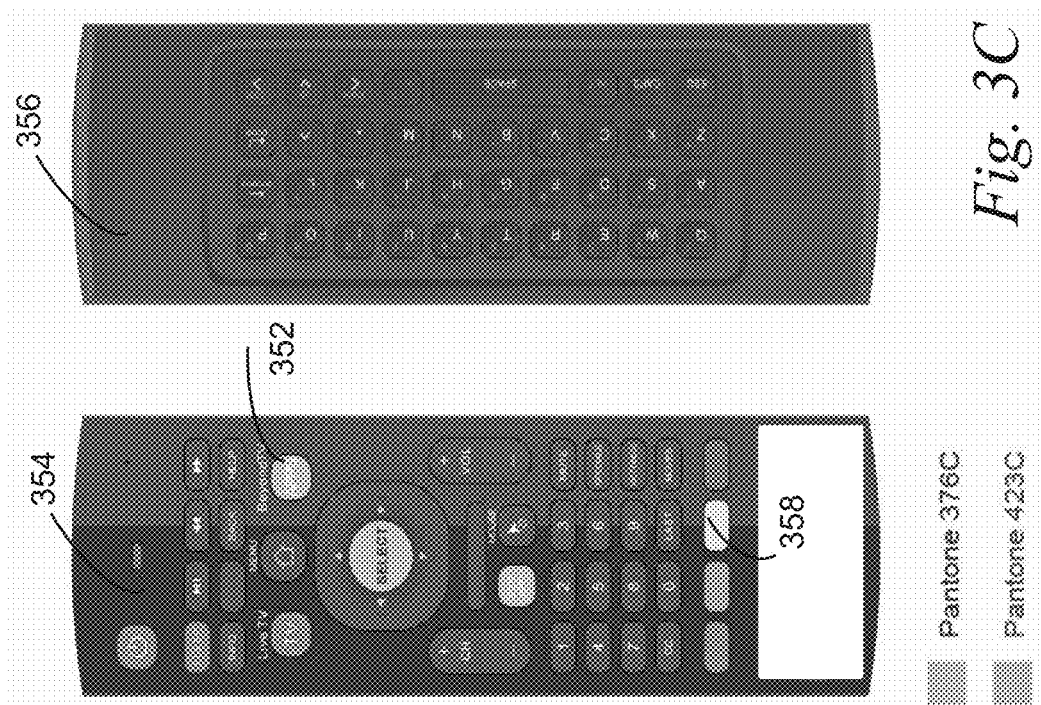

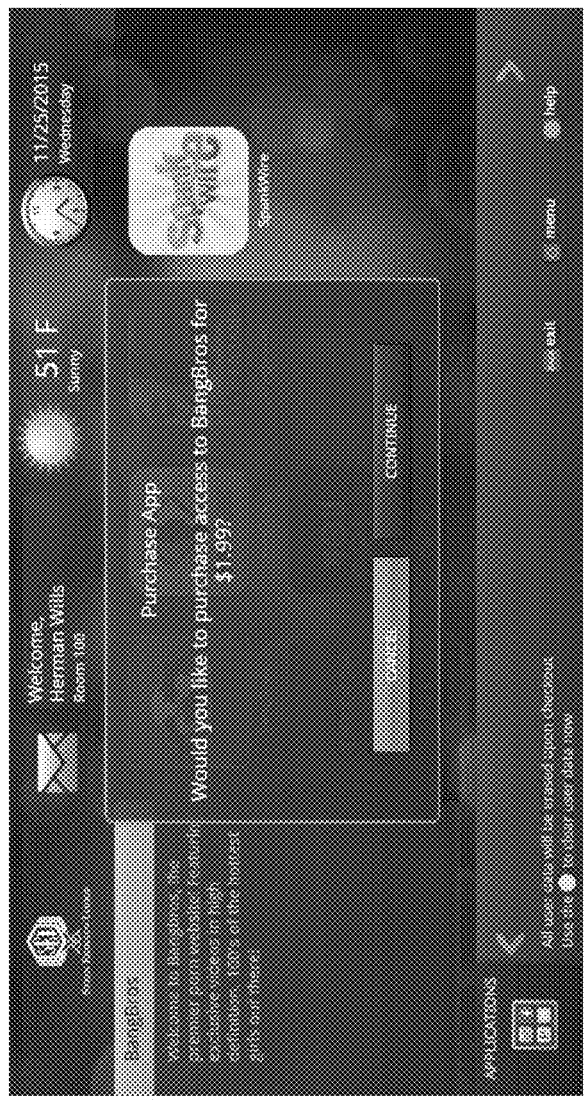
Fig. 6G
Fig. 6H

SYSTEMS AND METHODS AUTOMATICALLY ERASING CONTENT STORED ON A SET TOP BOX

CROSS-REFERENCE TO RELATED APPLICATIONS

This application is a continuation of U.S. patent application Ser. No. 15/257,256, titled "SYSTEMS AND METHODS AUTOMATICALLY ERASING CONTENT STORED ON A SET TOP BOX," and filed Sep. 6, 2016, which claims the benefit of, and priority to U.S. Provisional Patent Application No. 62/273,916, titled "SYSTEMS AND METHODS FOR REMOTE DELETE CONFIGURATION," and filed on Dec. 31, 2015, all of which are incorporated herein by reference in its entirety.

FIELD OF THE DISCLOSURE

The present disclosure is generally directed to security and privacy related issues relating to set top boxes deployed at locations where network connectivity is restricted. In particular, the present disclosure describes techniques for automatically erasing content stored on a set top box via a remote device or a via a reset request from a hotel management system.

BACKGROUND OF THE DISCLOSURE

Many hotel rooms are equipped with a set top box through which guests of the hotel room can watch content on a television. The guests can request access to particular types of content through the set top box, which is linked to a hotel management system of the hotel. When the guest checks out of the hotel, the hotel charges the guest for the requested access to the content. In existing systems, the content that the guest can request access to is limited and often overpriced. As a result, very few guests request access to content via the set top box.

BRIEF SUMMARY OF THE DISCLOSURE

Systems and methods of the present solution are directed to authenticating and providing application access via a hotel management system. As described above, many hotel rooms are equipped with a set top box through which guests of the hotel room can watch content on a television. The set top box equipped in hotel rooms is often linked to a hotel management system, through which the set top box can receive content that can be displayed on the television. The content can include services offered by the hotel as well as other relevant information relating to the hotel and the guest's stay. Examples of the content can include weather information, nearby attractions and things to do. In addition, the set top box can be configured to receive requests to purchase access to particular types of content, for instance, movies, music, among others. The set top box can provide the requests to the hotel management system, which can then process the requests and provide the set top box authorization to provide the content associated with the requests.

Guests staying at hotels often have subscribed to various services through which the guests can access content, such as movies and music. For instance, guests may have subscription accounts with various content streaming platforms, such as HULU, NETFLIX, AMAZON VIDEO, among others. As such, guests, instead of purchasing access to content via the set top box, may stream content on their personal devices from the various content streaming platforms. This may adversely affect the hotel in that the guests may stream the content using the hotel's internet connection, thereby affecting the performance of the internet the hotel offers its guests. Moreover, hotels may face reduced revenues due to the lack of demand or interest in the content provided by the set top boxes of the hotels.

In an effort to address the challenges mentioned above and for other reasons, the systems and methods of the present solution are directed to authenticating and providing application access via a hotel management system. According to some aspects, the present solution may help alleviate the increased consumption of bandwidth of the hotel's internet by managing the access to applications and the delivery of content of guests. In one aspect, an intermediary box, for instance, a set top box, can be connected to a hotel management system and an Internet connection and television. The set top box can include a memory on which one or more applications are installed that can provide access to corresponding media streaming services. The intermediary box can control access to the applications via authorization of payment for bandwidth via the hotel management system.

According to one aspect, a method for authenticating and providing application access via a hotel management system is described. The method can be performed by a cloud management system. The cloud management system establishes a first connection with a hotel management system of a hotel property and a second connection with a set top box of the hotel property. The set top box includes a plurality of applications accessible by a guest of the hotel property. The cloud management system receives, from the set top box via the second connection, a request of a guest of the hotel property to purchase access to an application of the plurality of applications provided by the set top box. The cloud management system transmits, to the hotel management system via the first connection a request for payment to an account of the guest at the hotel property. The cloud management system then transmits, responsive to receiving approval for payment from the hotel management system, an approval to purchase access to the application via the second connection to the set top box.

In some implementations, the set top box can grant access to the application to the guest of the hotel property responsive to receiving the approval for payment. In some implementations, the set top box can launch the application to be displayed on a viewing device of at least one of the hotel property accessible by the guest or a guest's mobile device. In some implementations, the set top box can prevent access to the application until receipt of approval for payment from the hotel management system.

In some implementations, the cloud management system can receive a request to assign a set top box to an account of the guest, the set top box corresponding to a room of the hotel property to which the guest is assigned. The cloud management system can then assign the set top box corresponding to the room to the account of the guest. In some implementations, the cloud management system can transmit data corresponding to the account of the guest maintained by the hotel management system to the set top box responsive to assigning the set top box corresponding to the room to the account of the guest. In some implementations, the cloud management system can receive an indication from the hotel management system that the guest has checked out of the room. The cloud management system can then transmit a request to terminate access to the application of the set top box responsive to receiving the indication. In some implementations, the set top box can terminate access to the application responsive to receiving the request to terminate access.

In some implementations, the set top box can establish a third connection with a mobile device of the guest, the mobile device including a second application configured to provide an interface to communicate with the set top box. The set top box can transmit content for display on a display of the mobile device via the second application responsive to granting access to the application to the guest. In some implementations, the set top box can receive an indication of an action performed at the second application of the mobile device via the third connection. The set top box can then transmit, responsive to receiving the indication of the action performed at the second application, supplemental content for display on the display of the mobile device. The supplemental content can be received by the set top box via a fourth connection established with a server of the application of the set top box.

According to another aspect, a system for authenticating and providing application access via a hotel management system is described. The system includes a cloud management system configured to communicate with a hotel management system of a hotel property via a first connection. The system also includes a set top box configured to communicate with the cloud management system via a second connection. The set top box includes a plurality of applications accessible by a guest of the hotel property. The cloud management system is configured to receive from the set top box via the second connection a request of a guest of the hotel property to purchase access to an application of the plurality of applications provided by the set top box and transmit to the hotel management system via the first connection a request for payment to an account of the guest at the hotel property. The cloud management system is further configured to transmit, responsive to receiving approval for payment from the hotel management system, an approval to purchase access to the application via the second connection to the set top box.

In some implementations, the set top box can grant access to the application to the guest of the hotel property responsive to receiving the approval for payment. In some implementations, the set top box can launch the application to be displayed on a viewing device of at least one of the hotel property accessible by the guest or a guest's mobile device. In some implementations, the set top box can prevent access to the application until receipt of approval for payment from the hotel management system.

In some implementations, the cloud management system can receive a request to assign a set top box to an account of the guest, the set top box corresponding to a room of the hotel property to which the guest is assigned. The cloud management system can then assign the set top box corresponding to the room to the account of the guest. In some implementations, the cloud management system can transmit data corresponding to the account of the guest maintained by the hotel management system to the set top box responsive to assigning the set top box corresponding to the room to the account of the guest. In some implementations, the cloud management system can receive an indication from the hotel management system that the guest has checked out of the room. The cloud management system can then transmit a request to terminate access to the application of the set top box responsive to receiving the indication. In some implementations, the set top box can terminate access to the application responsive to receiving the request to terminate access.

In some implementations, the set top box can establish a third connection with a mobile device of the guest, the mobile device including a second application configured to provide an interface to communicate with the set top box. The set top box can transmit content for display on a display of the mobile device via the second application responsive to granting access to the application to the guest. In some implementations, the set top box can receive an indication of an action performed at the second application of the mobile device via the third connection. The set top box can then transmit, responsive to receiving the indication of the action performed at the second application, supplemental content for display on the display of the mobile device. The supplemental content can be received by the set top box via a fourth connection established with a server of the application of the set top box.

According to another aspect, methods and systems for erasing content stored on a set top box via a dedicated input object of a remote input device are described. A set top box receives a request to activate the set top box. The set top box can create a storage location to which the set top box is configured to store identifiers and passwords of a guest. The set top box can store one or more user identifiers and passwords of the guest that correspond to one of one or more applications or web services accessed via the set top box. The set top box can receive, from a remote control device via a wireless communication, a command to delete the user identifiers and passwords stored on the set top box responsive to selection of a delete button on the remote control device. An agent executing on the set top box can delete the one or more user identifiers and passwords from the set top box responsive to receipt of the command.

According to another aspect, methods and systems for erasing content stored on a set top box responsive to a guest checking out from a hotel are described. A set top box receives a request to activate the set top box. The set top box can create a storage location to which the set top box is configured to store identifiers and passwords of a guest. The set top box can store one or more user identifiers and passwords of the guest that correspond to one of one or more applications or web services accessed via the set top box. The set top box can receive a communication identifying that the guest of the hotel property corresponding to the set top box has checked out from the hotel property. An agent executing on the set top box can delete the one or more user identifiers and passwords from the set top box responsive to receipt of the communication.

According to another aspect, a system for erasing content stored on a set top box is described. The system includes a set top box comprising a plurality of applications or web services accessible by a user of a hotel property. The set top box is configured to store one or more user identifiers and passwords of the user corresponding to one of the plurality of applications or web services accessed via the set top box. A remote control device is configured to communicate with the set top box. The remote control device is configured to transmit a command to delete the user's history on the device responsive to selection of a delete button on the remote control device. The set top box comprises an agent configured to delete the one or more user identifiers and passwords from the set top box responsive to receipt of the command.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 3C illustrates a front view and a back view of an input device configured to operate with the set top box shown in FIG. 3A;

FIGS. 6A-6M are screenshots of a display on which a user interface of the set top box is displayed;

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for authenticating and providing application access via a hotel management system.

Section C describes embodiments of systems and methods for automatically erasing content stored on a set top box.

A. Computing and Network Environment

Figure 1A:
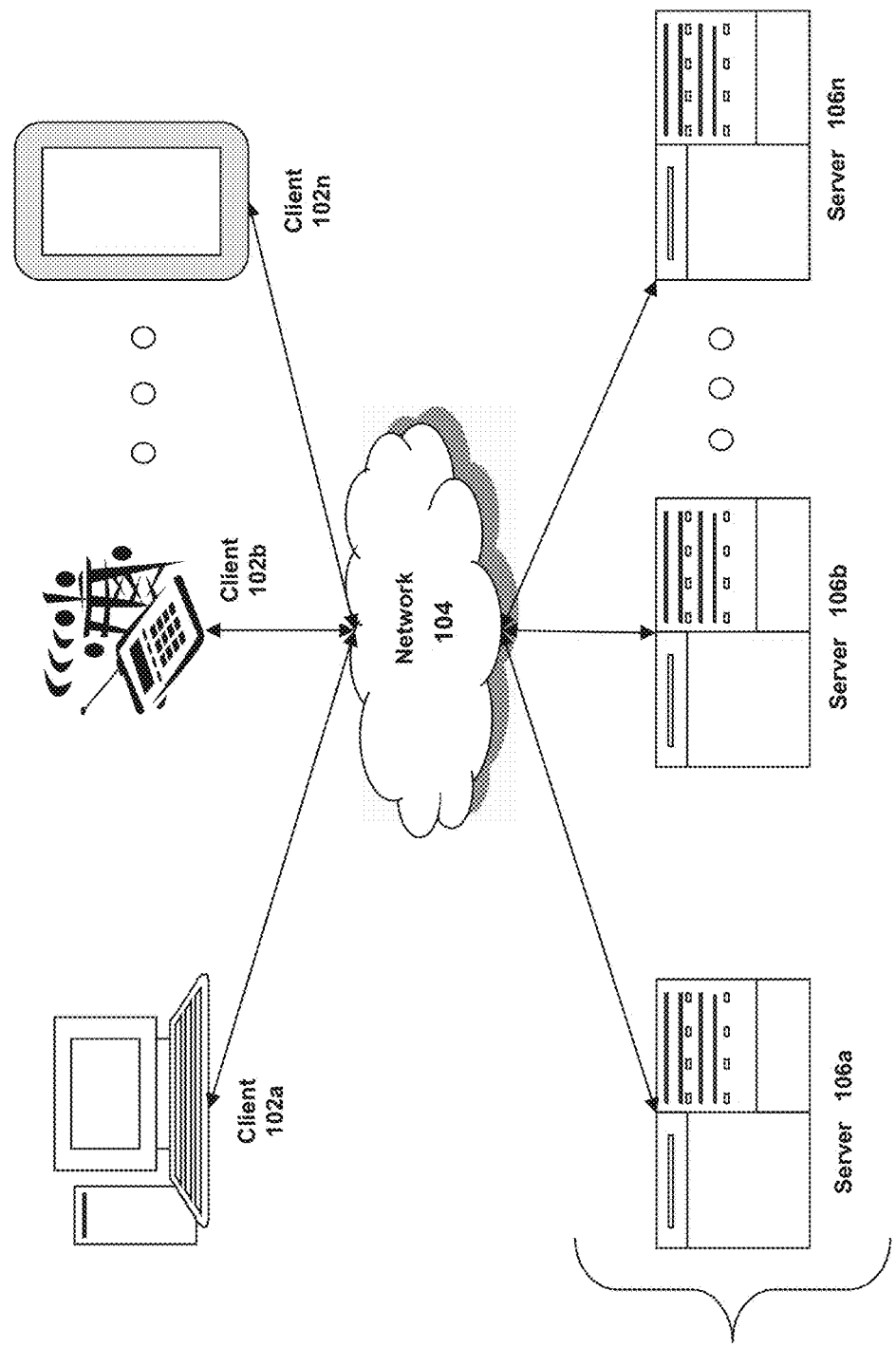
FIG. 1A is a block diagram depicting an embodiment of a network environment comprising a client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
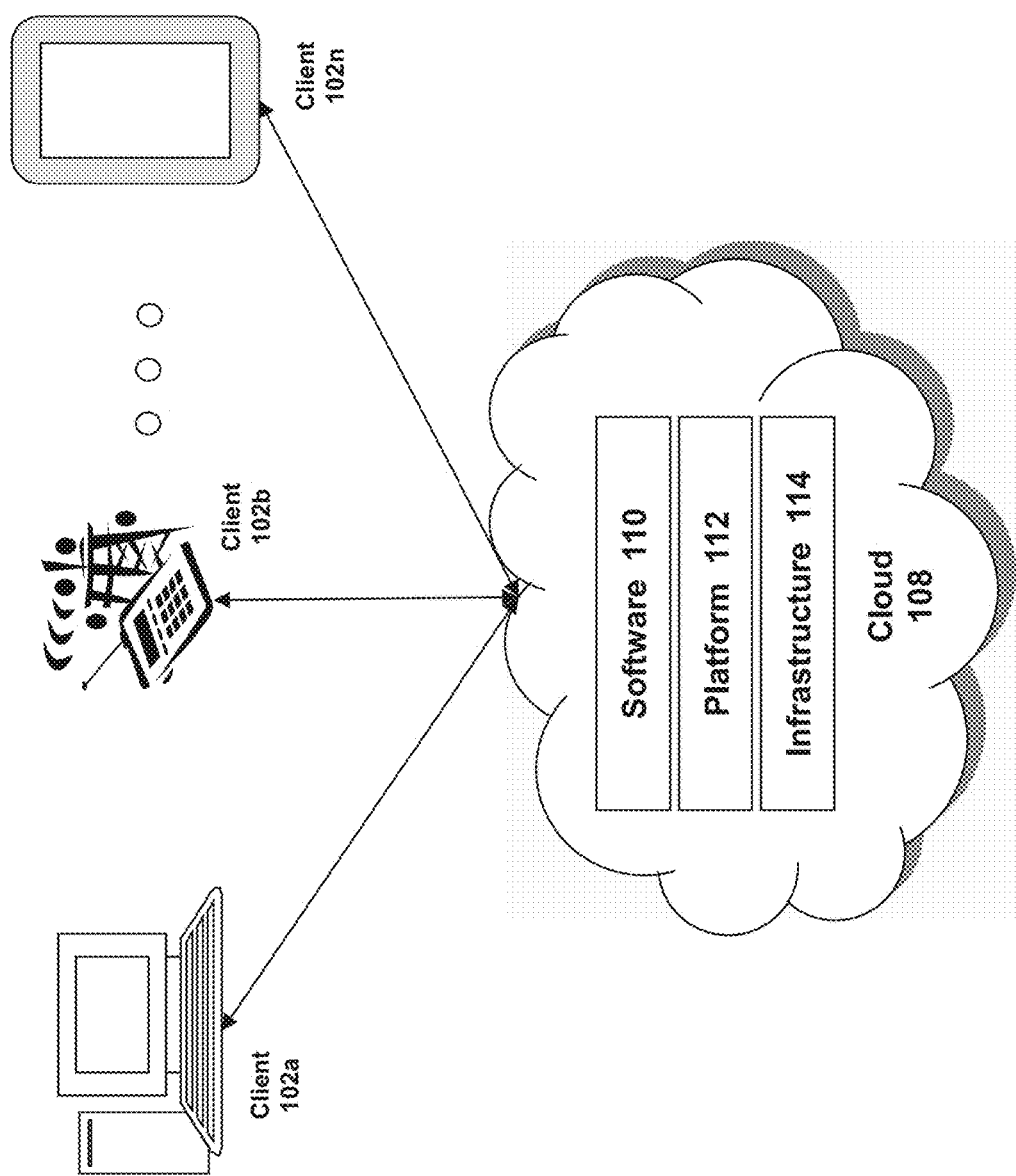
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
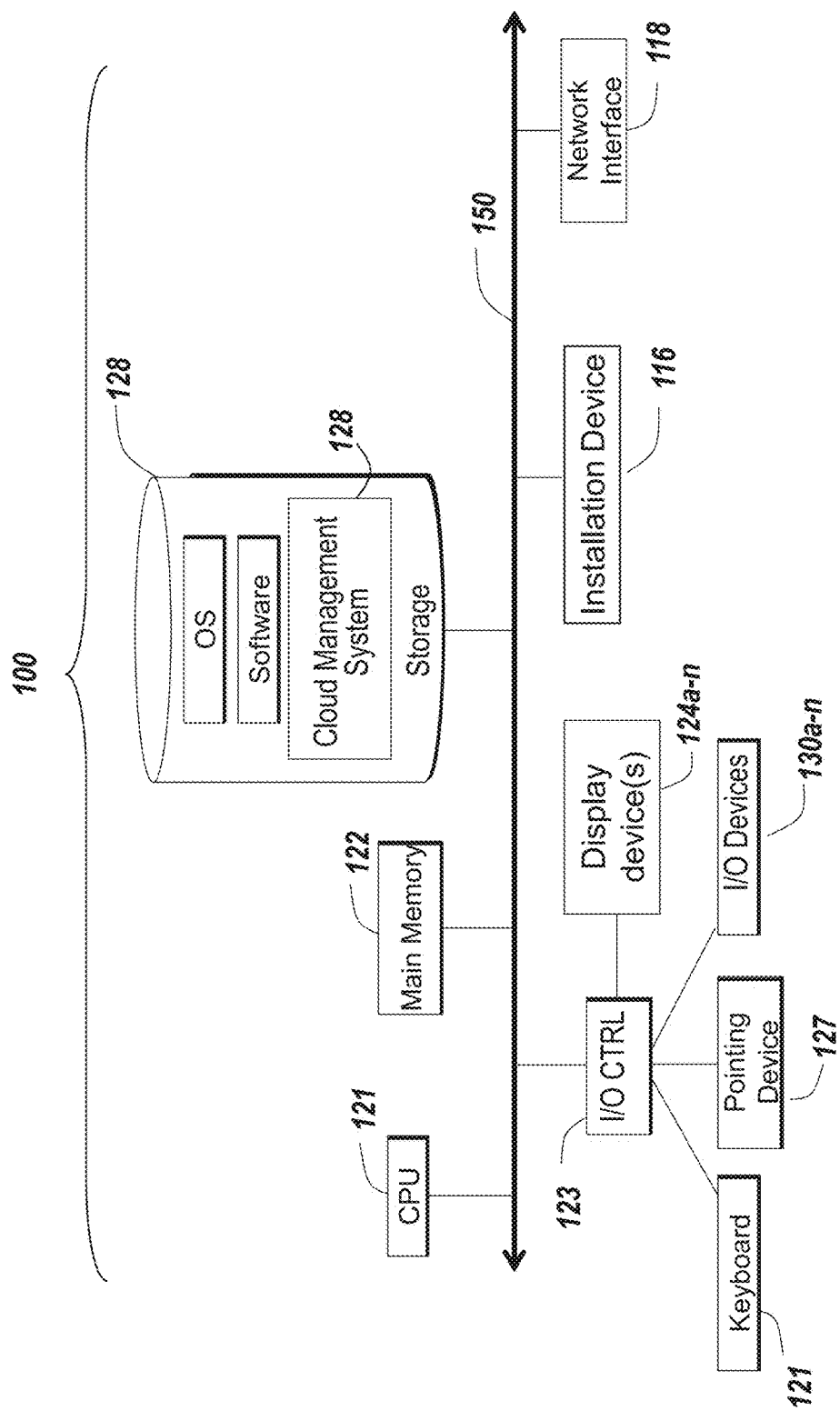
FIGS. 1C and 1D are block diagrams depicting embodiments of computing devices useful in connection with the methods and systems described herein.
Figure 1D:
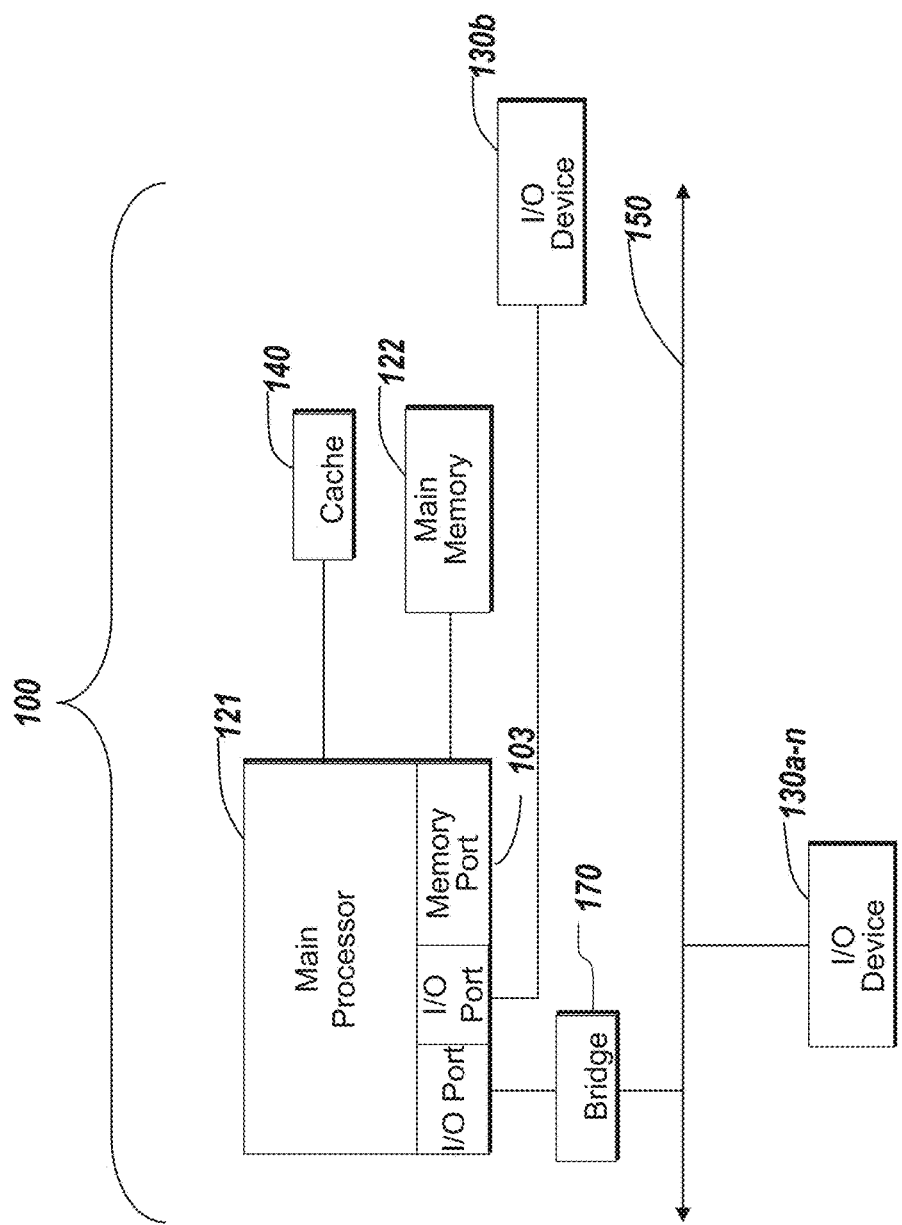

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a cloud management system 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAIVI), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130*b* or other processors 121' via HYPERTRANSPORT, RAPIDIO, or INFINIBAND communications technology. FIG. 1D also depicts an embodiment in which local busses and direct communication are mixed: the processor 121 communicates with I/O device 130*a* using a local interconnect bus while communicating with I/O device 130*b* directly.

A wide variety of I/O devices 130*a*-130*n* may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130*a*-130*n* may include a combination of multiple input or output devices, including, e.g., Microsoft KINECT, Nintendo Wiimote for the WII, Nintendo WII U GAMEPAD, or Apple IPHONE. Some devices 130*a*-130*n* allow gesture recognition inputs through combining some of the inputs and outputs. Some devices 130*a*-130*n* provides for facial recognition which may be utilized as an input for different purposes including authentication and other commands. Some devices 130*a*-130*n* provides for voice recognition and inputs, including, e.g., Microsoft KINECT, SIRI for IPHONE by Apple, Google Now or Google Voice Search.

Additional devices 130*a*-130*n* have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130*a*-130*n*, display devices 124*a*-124*n* or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124*a*-124*n* may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124*a*-124*n* may also be a head-mounted display (HMD). In some embodiments, display devices 124*a*-124*n* or the corresponding I/O controllers 123 may be controlled through or have hardware support for OPENGL or DIRECTX API or other graphics libraries.

In some embodiments, the computing device 100 may include or connect to multiple display devices 124*a*-124*n*, which each may be of the same or different type and/or form. As such, any of the I/O devices 130*a*-130*n* and/or the I/O controller 123 may include any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may include multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices 100*a* or 100*b* connected to the computing device 100, via the network 104. In some embodiments software may be designed and constructed to use another computer's display device as a second display device 124*a* for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124*a*-124*n*.

Referring again to FIG. 1C, the computing device 100 may comprise a storage device 128 (e.g. one or more hard disk drives or redundant arrays of independent disks) for storing an operating system or other related software, and for storing application software programs such as any program related to the software for the cloud management system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage devices 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2022, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Authenticating and Providing Application Access to Set Top Boxes Via a Hotel Management System Systems and methods of the present solution are directed to authenticating and providing application access via a hotel management system. As described above, many hotel rooms are equipped with a set top box through which guests of the hotel room can watch content on a television. The set top box equipped in hotel rooms is often linked to a hotel management system, through which the set top box can receive content that can be displayed on the television. The content can include services offered by the hotel as well as other relevant information relating to the hotel and the guest's stay. Examples of the content can include weather information, nearby attractions and things to do. In addition, the set top box can be configured to receive requests to purchase access to particular types of content, for instance, movies, music, among others. The set top box can provide the requests to the hotel management system, which can then process the requests and provide the set top box authorization to provide the content associated with the requests.

In some implementations, a room can be equipped with a set top box that is coupled to a television via a cable, such as an HDMI connection. The set top box can be configured to communicate and link with the hotel management system of the hotel that manages one or more services provided by the hotel to the guests. The room can also be equipped with an input device, such as a remote control, via which a guest can interact with the set top box. The set top box can connect to one or more networks, including the Internet, via one or more wireless or wired connections. In some implementations, these connections may be secure such that other devices of the guest may be restricted access. A guest can, via the input device, utilize the set top box as a device for accessing content, such as movies, songs, and other web-based content via the internet. The guest may be charged a fee to access the content via the internet. In some implementations, the guest may be charged to access one or more applications that can be installed on the set top box, for instance, content streaming applications, such as NETFLIX, HULU, AMAZON VIDEO, PANDORA, SPOTIFY, among others. The hotel management system with which the set top box can communicate can be used for billing purposes and activating and deactivating the set top box based on an amount of data streamed or a length of time for which access to the application is provided. Furthermore, the set top box can be configured to automatically delete the data the guest entered in the set top box, such as passwords and other login credentials. In some implementations, the hotel management system may send a request to delete the data responsive to determining that the guest has checked out of the hotel.

In some implementations, the input device of the set top box can be configured to include a dedicated button that can cause the set top box to erase information relating to the guest's activity via the set top box. This information can include browsing history, login credentials, files, cookies, or other content that may have been stored on the set top box while the guest was accessing content via the set top box. The input device can further include a tracking signal. The tracking signal can be configured to trigger an alarm if the input device is removed from a predefined location. In some implementations, the input device may be deactivated if the input signal is not receiving an actuation signal that is only available in the predefined location. This feature may deter thefts of the input devices.

In some implementations, each set top box can establish a private virtual network that is secured such that only the guest's devices can connect to the set top box via the private virtual network. In this way, information of the guest remains secure and out of reach of devices of other guests or people seeking to gain access to the guest's computing devices.

Guests staying at hotels often have subscribed to various services through which the guests can access content, such as movies and music. For instance, guests may have subscription accounts with various content streaming platforms, such as HULU, NETFLIX, AMAZON VIDEO, among others. As such, guests, instead of purchasing access to content via the set top box, may stream content on their personal devices from the various content streaming platforms. This may adversely affect the hotel in that the guests may stream the content using the hotel's internet connection, thereby affecting the performance of the internet the hotel offers its guests. Moreover, hotels may face reduced revenues due to the lack of demand or interest in the content provided by the set top boxes of the hotels.

In an effort to address the challenges mentioned above and for other reasons, the systems and methods of the present solution are directed to authenticating and providing application access via a hotel management system. According to some aspects, the present solution may help alleviate the increased consumption of bandwidth of the hotel's internet by managing the access to applications and the delivery of content of guests. In one aspect, an intermediary box, for instance, a set top box can be connected to a hotel management system and an Internet connection and television. The set top box can include a memory on which one or more applications are installed that can provide access to corresponding media streaming services. The intermediary box can control access to the applications via authorization of payment for bandwidth via the hotel management system.

According to one aspect, a method for authenticating and providing application access via a hotel management system is described. The method can be performed by a cloud management system. The cloud management system establishes a first connection with a hotel management system of a hotel property and a second connection with a set top box of the hotel property. The set top box includes a plurality of applications accessible by a guest of the hotel property. The cloud management system receives, from the set top box via the second connection, a request of a guest of the hotel property to purchase access to an application of the plurality of applications provided by the set top box. The cloud management system transmits, to the hotel management system via the first connection a request for payment to an account of the guest at the hotel property. The cloud management system then transmits, responsive to receiving approval for payment from the hotel management system, an approval to purchase access to the application via the second connection to the set top box.

In some implementations, the set top box can grant access to the application to the guest of the hotel property responsive to receiving the approval for payment. In some implementations, the set top box can launch the application to be displayed on a viewing device of at least one of the hotel property accessible by the guest or a guest's mobile device. In some implementations, the set top box can prevent access to the application until receipt of approval for payment from the hotel management system.

In some implementations, the cloud management system can receive a request to assign a set top box to an account of the guest, the set top box corresponding to a room of the hotel property to which the guest is assigned. The cloud management system can then assign the set top box corresponding to the room to the account of the guest. In some implementations, the cloud management system can transmit data corresponding to the account of the guest maintained by the hotel management system to the set top box responsive to assigning the set top box corresponding to the room to the account of the guest. In some implementations, the cloud management system can receive an indication from the hotel management system that the guest has checked out of the room. The cloud management system can then transmit a request to terminate access to the application of the set top box responsive to receiving the indication. In some implementations, the set top box can terminate access to the application responsive to receiving the request to terminate access.

In some implementations, the set top box can establish a third connection with a mobile device of the guest, the mobile device including a second application configured to provide an interface to communicate with the set top box. The set top box can transmit content for display on a display of the mobile device via the second application responsive to granting access to the application to the guest. In some implementations, the set top box can receive an indication of an action performed at the second application of the mobile device via the third connection. The set top box can then transmit, responsive to receiving the indication of the action performed at the second mobile application, supplemental content for display on the display of the mobile device. The supplemental content can be received by the set top box via a fourth connection established with a server of the mobile application of the set top box.

Figure 2A:
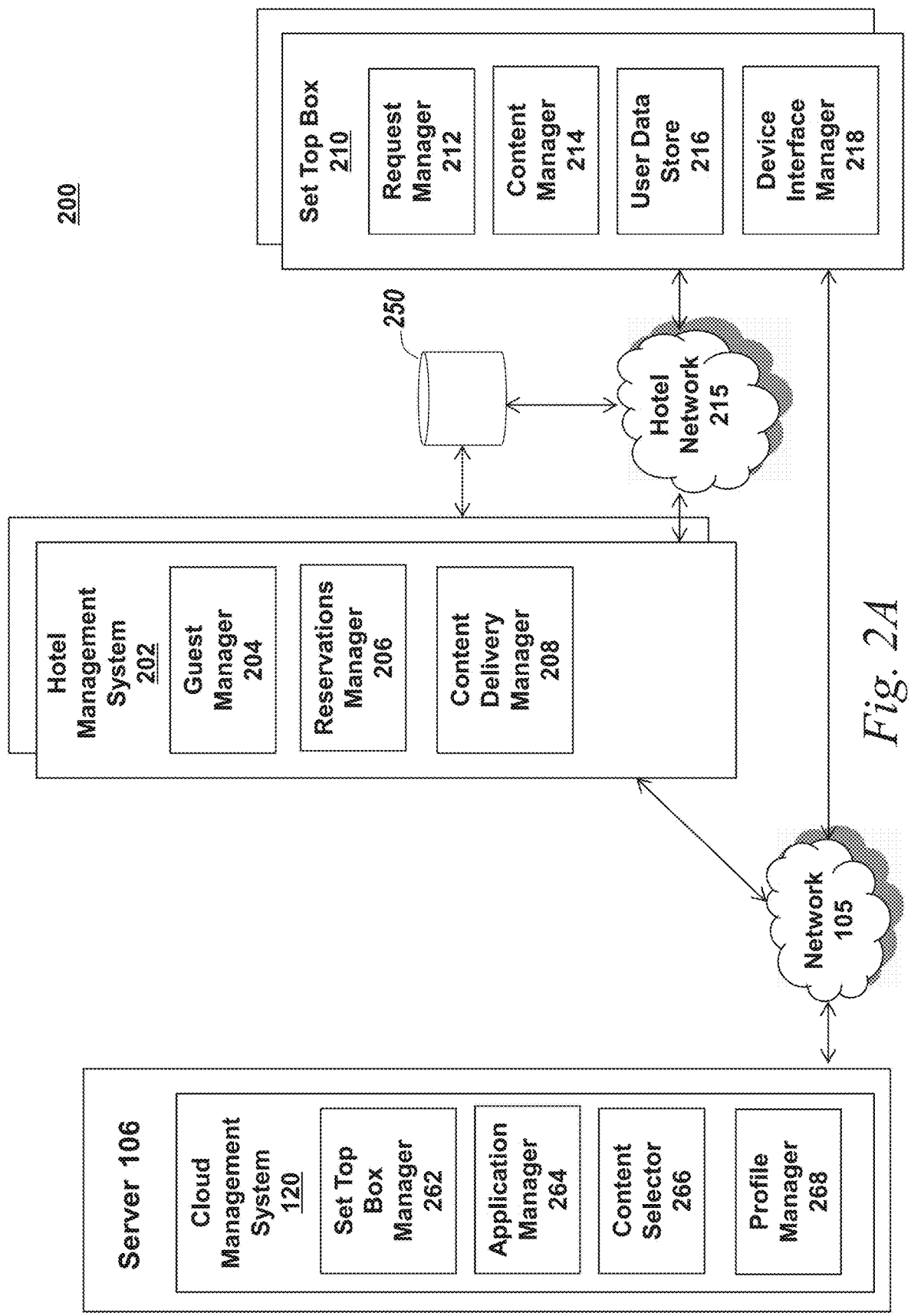
FIG. 2A is a block diagram depicting an embodiment of a system for authenticating and providing application access via a hotel management system.

Referring now to FIG. 2A, a content delivery environment 200 is depicted. The content delivery environment 200 can include one or more hotel management systems 208, a plurality of set top boxes 210, and a server 106 executing a cloud management system 120, such as the cloud management system 120 shown in FIG. 1C. The hotel management system 240, the set top boxes 210, and the server 106 may communicate with one another over a network 105, such as the Internet. The hotel management system 202 and the set top boxes 210 may communicate with one another via a second network 215 (shown as hotel network 215). The second network 215 may extend within premises of a hotel. In some implementations, the second network 215 may be secure such that other devices, for instance, devices of guests of the hotel may not be able to access content via the second network 215. In addition, the content delivery environment 200 may include one or more databases 250 that store content accessible by the hotel management system and the set top box via the second network 215.

The hotel management system 202 may execute on one or more servers, such as the server 106. The hotel management system can include a guest manager 204, a reservations manager 206 and a content delivery manager 208, among others. The hotel management system 202 can also include one or more modules for managing a hotel network, such as the hotel network 215. The hotel management system 202 can also maintain one or more databases, such as the database 250.

The guest manager 204 can comprise components, subsystems, modules, scripts or one or more sets of computer-executable instructions and can be configured to manage a guest database. In some implementations, the guest manager 204 can be configured to create, maintain and update one or more guest databases. The guest database can include a table including a plurality of entries, each entry corresponding to a guest of the hotel. The guest can be a guest that has already stayed at the hotel or a guest that has made a reservation to stay at the hotel. The guest manager 204 can be configured to maintain the guest database in a storage location, such as the database 250. In some implementations, each entry of the guest database can correspond to a guest. Each entry can include a plurality of fields, including but not limited to a name field, an address field, an email address field, a phone number field, one or more preferences fields, one or more payment information fields, a room field identifying a current room to which the guest is assigned, a room history field identifying data corresponding to previous stays of the guest at the hotel, among others. In some implementations, one of the preferences fields can include information about the types of content the guest has previously accessed through a set top box of the hotel. In some implementations, the preferences field can be updated after each stay by the guest. In some implementations, the preferences field can be updated after the guest makes a request to access a particular application via the set top box assigned to the guest. The guest database can also include additional information, including authentication credentials to one or more applications to which the guest has subscribed and accessed via a set top box of the hotel.

The reservations manager 206 can comprise components, subsystems, modules, scripts or one or more sets of computer-executable instructions and can be configured to manage a reservations database. In some implementations, the reservations manager 206 can be configured to create, maintain and update one or more reservations databases. The reservations database can include a table including a plurality of entries, each entry corresponding to a room of the hotel. The reservations manager 206 can be configured to maintain the reservations database in a storage location, such as the database 250. In some implementations, each entry of the reservations database can correspond to a room of the hotel. Each entry can include a plurality of fields, including but not limited to a reservations identifier field identifying a reservations, a room number to be assigned to the guest according to the reservations, a room type field, a room preferences type (for instance, smoking or non-smoking, king bed or queen bed, among others), a floor field identifying a floor on which the room is located, a set top box identifier field identifying a set top box equipped in the room, a guest assignment field identifying a guest assigned to the room, among others.

The reservations manager 206 can be configured to update an entry corresponding to a particular reservation responsive to receiving a request to assign a guest to a particular room. In some implementations, the reservations manager 206 can identify the room to which a guest is being assigned. The reservations manager 206 can then identify an entry in the reservations database corresponding to the identified room and update the guest assignment field to include information uniquely identifying the guest.

The reservations manager 206 can be configured to update an entry corresponding to a particular reservation responsive to receiving a request to checkout a guest. In some implementations, the reservations manager 206 can identify an entry in the reservations database corresponding to the reservation and update the entry to indicate that the guest has checked out of the room. The reservations manager 206 can further be configured to cause the hotel management system 202 to take additional actions. In some implementations, the hotel management system 202 can be configured to cause the set top box to be reset responsive to determining that a guest has checked out from a room of the hotel. By resetting the set top box, any information pertaining to the guest's usage of the set top box can be removed prior to another guest accessing the set top box equipped in the room. In this way, the privacy of the guest who checked out is maintained and any accounts to which the guest subscribes are not accessible by any future guests of the hotel room. Additional details regarding resetting the set top box are described with respect to the set top box 210.

The content delivery manager 208 can comprise components, subsystems, modules, scripts or one or more sets of computer-executable instructions and can be configured to manage the delivery of content to the set top boxes 210. The content delivery manager 208 can be configured to communicate with each of the set top boxes 210 equipped in rooms of the hotel. The content delivery manager 208 can be configured to establish connections with each of the set top boxes 210. In some implementations, the content delivery manager 208 can be configured to establish a connection with a set top box 210 responsive to the reservations manager 206 updating an entry of the reservations database corresponding to a room being assigned to a guest. The content delivery manager 208 can be configured to identify the set top box assigned to the room from the entry of the reservations database. The content delivery manager 208 can utilize the identity of the set top box to establish a connection with the set top box 210 via the network 215. The content delivery manager 208 can be configured to transmit a request to configure the set top box 210 based on the guest to whom the room is assigned. In some implementations, the request can include instructions to provide the set top box 210 information regarding the reservation or the guest, for instance, the name of the guest, the length of the guest's stay, one or more preferences of the guest, and in some implementations, installing one or more applications on the set top box to which the guest has accounts. In some implementations, the applications can include content streaming applications, such as AMAZON, HULU, NETFLIX, SPOTIFY, PANDORA among others. In some implementations, the applications can include social networking applications, such as FACEBOOK, TWITTER, INSTAGRAM, among others. In some implementations, the applications can include other applications, such as news applications, or other content-based applications, such as FLIPBOARD, among others.

The content delivery manager 208 can be configured to communicate with the server 106 executing the cloud management system 120. The content delivery manager 208 can be configured to communicate with the cloud management system 120 via the network 105. In some implementations, the content delivery manager 208 can be configured to receive, from the cloud management system 120, one or more requests to provide, to a set top box 210, access to content of one or more applications. For instance, the cloud management system 120 can be configured to transmit a request to purchase access to content of an application installed on the set top box or a request to authorize installation of an application on the set top box. In some implementations, the cloud management system 120 can be configured to transmit the request to purchase access to content of an application responsive to the cloud management system 120 receiving a request from a guest of the hotel room via the set top box equipped in the hotel room.

The content delivery manager 208 can be configured to receive a request to purchase access to content of an application installed on the set top box from the cloud management system 120. The request can identify the set top box to which to enable access to the content as well as information pertaining to a guest requesting to purchase access to the content. The content delivery manager 208 can be configured to receive payment information via the request and can be configured to authenticate the request and the payment information via one or more of the guest manager 204 or the reservations manager 206.

The content delivery manager 208 upon authenticating the request, can transmit a response to one or more of the cloud management system 120 or the set top box 210 for which the request to purchase access was transmitted authorizing the set top box to access content of the application. In some implementations, the content delivery manager 208 can transmit a response to one or more of the cloud management system 120 or the set top box 210 for which the request to purchase access was transmitted denying authorization to the set top box to access content of the application. In some implementations, the content delivery manager 208 may deny authorization responsive to determining that the payment information is invalid or if the application for which access is requested is not supported by the hotel management system or the set top box, among others.

The content delivery manager 208 can be configured to cause the hotel management system 202 to generate a charge for the purchased access. The content delivery manager 208 can communicate with the reservations manager 206 to update an entry corresponding to the reservation to include a charge corresponding to the purchased access. In some implementations in which guests may prepay or receive prior authorization to access content of one or more applications, the content delivery manager 208 can be configured to determine that the guest has previously been authorized access to the application and may transmit a response authorizing access to the application responsive to receiving a request from the cloud management system 120. In some implementations, the content delivery manager 208 can be configured to set instructions to the set top box during configuration indicating that the guest is authorized to access one or more applications. As such, the guest may access content of the application without having to submit a request to purchase access to the application via the set top box.

Each set top box 210 can include hardware and software. The set top box 210 can include a processor, memory, and one or more computer-executable instructions configured to be executed by the processor. The set top box 210 can be coupled to a television or other display. In some implementations, the set top box 210 can be integral to the television or display. The set top box can be configured to include a request manager 212, a content manager 214, a reset manager 216 and a device interface manager 218. The set top box can be configured to communicate with the hotel management system 202 and the server of the cloud management system 120. In some implementations, the set top box can include a first communication interface through which the set top box communicates with the hotel management system 202 via a local network, such as the network 215. The set top box 210 can also include a second communication interface through which the set top box 210 can communicate with the server 106 of the cloud management system 120 via the network 105.

The set top box 210 can be operated using a remote control, mouse, keyboard, touchscreen or other input peripheral. In some implementations, the set top box 210 can be paired to communicate with the guest's mobile device, such as a mobile phone or tablet. The set top box can be configured to be paired with the guest's mobile device.

The set top box 210 can include one or more preinstalled applications, including content streaming applications for which guests may have subscription accounts. In some implementations, the set top box 210 can be configured to install one or more applications from an applications database, such as the GOOGLE PLAY STORE or the APPLE APP STORE, among others. In some implementations, the set top box 210 can be configured to install one or more applications on the set top box from a locally stored and maintained applications database, such as the database 250. In some implementations, the set top box 210 can be configured to allow guests to install applications on the set top box responsive to approval from the hotel management system 202 or the cloud management system 120.

The request manager 212 can comprise components, subsystems, modules, scripts or one or more sets of computer-executable instructions and can be configured to receive one or more requests. In some implementations, the request manager 212 can be configured to receive requests from the hotel management system 240 via the network 105 or the second network 215. In some implementations, the request manager 212 can be configured to receive a request from the hotel management system 202 to configure the set top box. The request to configure the set top box can be received in response to the hotel management system checking in a guest or assigning a guest to a room in which the set top box is located. As described above, the request to configure the set top box can include reservation information pertaining to the reservation of the guest.

The request manager 212 can be configured to configure the set top box 210. The request manager 212 can configure the set top box by updating one or more applications, files, content objects, stored on the set top box 210 to include information relating to the reservation. In addition, the request manager 212 can configure the set top box 210 such that any requests for content are tracked and monitored. The request manager 212 can configure the set top box 210 such that when a guest assigned to the room requests a service from the hotel management system, the set top box 210 can transmit a request to the hotel management system that includes an identifier associated with the reservation or the guest. The hotel management system can use the identifier of the reservation or the guest to charge any services received by the guest to the guest upon checkout.

The request manager 212 can receive an input from a user to purchase access to one or more applications. The user can provide the input via an input device communicatively coupled with the set top box 210. For instance, the user can select an icon displayed on a graphical user interface to access a particular application. In response, the set top box can determine if the guest is authorized to access the particular application or if the application is available for access. The set top box 210 can determine, responsive to a communication from the cloud management system or the hotel management system, or based on a lookup in a permissions database, whether the guest has permission to access the application. In some implementations, the set top box 210 can determine that the application is accessible if the set top box is configured to allow the application to launch. Responsive to receiving the input and determining that the application is not accessible (or content of the application is not accessible), the request manager 212 can generate a request to purchase access to the one or more applications (or to content of the applications) based on the input from the user. The request manager 212 can generate the request to purchase access to the application. The request to purchase access to the application can include one or more of an application identifier, a set top box identifier, a guest identifier, a reservation identifier, payment information or payment authorization information, among others.

The request manager 212 can be configured to transmit the request to purchase access to the application to the cloud management system 120. The request manager 212 can generate a request for transmission to the cloud management system. The request manager 212 can transmit the request via a communication interface of the set top box communicatively coupled to the cloud management system. The request manager 212 can transmit the request in one or more packets. The packets can include header information identifying the hotel associated with the set top box, a unique identifier of the set top box, among others. The header information can also identify an IP address of the cloud management system 120 to which to transmit the packets. The request manager 212 can be configured to generate the one or more packets used to transmit the request to the cloud management system 120.

In some implementations, the request manager 212 can be configured to transmit a request to the cloud management system 120 responsive to a user of the set top box requesting content. The request transmitted by the request manager 212 can include information identifying the set top box, such as a unique identifier of the set top box, for instance, a media access control (MAC) address of the set top box, an IP address of the set top box, or one or more other pieces of information that can be used by the cloud management system 120 to uniquely identify the set top box 210. In some implementations, the request can include information unique to a guest of the hotel to which the hotel room is assigned. As described above, the set top box 210 and the server 106 of the cloud management system 120 can communicate via the connection established over the network 105, such as the network 105.

The request manager 212 can be configured to receive one or more responses to requests transmitted by the request manager 212. The request manager 212 can execute instructions included in one or more responses or use information in the responses received by the set top box 210 to execute one or more computer-executable instructions. The request manager 212 can receive responses from the cloud management system 120 via the network 105 or the hotel management system 202 via the hotel network 215.

The content manager 214 can comprise components, subsystems, modules, scripts or one or more sets of computer-executable instructions and can be configured to manage access to content provided via one or more applications capable of executing on the set top box 210. The content manager 214 can determine content requested to be accessed by the guest via the guest's interactions with the set top box. The content manager 214 can be configured to determine if the content requested by the set top box is locally stored on the set top box to reduce the latency and the bandwidth consumed in transferring content from a remote server. The content manager 214 may be configured to determine if a storage device accessible via the hotel network 215 is storing the content requested by the guest. The content manager 214 may communicate with the request manager to retrieve content from a local storage of the set top box or from the storage device accessible via the hotel network 215 instead of transmitting a request to the cloud management server to retrieve the requested content. In this way, the amount of bandwidth of the network 105 consumed to access the requested content is conserved, thereby reducing the load on the network 105.

The content manager 214 can be configured to install one or more applications on the set top box 210. In some implementations, the content manager 214 may be configured to install applications on the set top box responsive to receiving authorization from the hotel management system or the cloud management system 120. In some implementations, the applications may already be installed on the set top box but the guests may not have authorization to access the applications. In some implementations, the content manager 214 can be configured to allow the guest to access an application installed on the set top box responsive to receiving data from the hotel management system 202 or the cloud management system 120 indicating that the set top box 210 is authorized to allow the guest access to the application.

The content manager 214 can be configured to receive requests to access content from one or more applications executing on the set top box 210. The applications can include content streaming applications, games, news applications, or one or more additional applications similar to applications that may be installed on a mobile device of the guest. The content manager 214 can be configured to identify content requested by the guest via the applications and store the identity of the content in a history folder of the application or a folder or database maintained by the set top box 210. The content manager 214 can share the identity of the content requested with the cloud management system and the hotel management system 202. In this way, when a large number of set top boxes at a particular hotel location request the same content, the cloud management system 120 and the hotel management system 202 may determine to store that content local to the hotel and allow guests to access the content via the hotel network 215 instead of the network 105.

In some implementations, the content manager 214 can be configured to identify content for the guest associated with the set top box. In some implementations, the content manager may be configured to analyze a guests' preferences in content based on the guest's previous content viewing history, social networking profile information, and other information made available to the set top box 210. In some implementations, the guest manager 204 of the hotel management system 202 may maintain information that can be used by the content manager 214 to determine content that the guest may be interested in accessing. In some implementations, the content manager 214 may retrieve content from various sources based on the preferences of the guest and provide recommendations to the guest to access the retrieved content.

The content manager 214 can further be configured to receive login credentials relating to one or more applications from the guest. In some implementations, the guest may provide authentication information pertaining to one or more applications via an input device of the set top box 210. The content manager 214 can be configured to store the authentication information in a security database maintained in memory of the set top box 210. The content manager 214 can maintain a table including a plurality of entries. Each entry of the table can correspond to a particular application installed on the set top box. The entry can include an application identifier, a guest name, a guest username, a guest password, payment information, among others. The content manager 214 can access the guest username and password from the table stored in the memory of the set top box. In some implementations, the content manager 214 can, responsive to a guest requesting to access a particular application that requires login credentials via the set top box, the content manager 214 can initiate an instance of the application, retrieve the login credentials (for instance, guest username and password) from the entry in the table corresponding to the application (for instance, based on a lookup of the table using the application identifier) and retrieve the login credentials from the table. The content manager 214 can then input the login credentials and provide the guest access to the application and its contents. In some implementations, the login credentials of an application may be stored in a folder maintained by the application or a browser, among others. In some implementations, the login credentials may be stored to allow a user to access the application multiple times without having to reenter the login credentials during each new session established with the application.

The reset manager 216 can comprise components, subsystems, modules, scripts or one or more sets of computer-executable instructions and can be configured to reset the set top box. In some implementations, the reset manager 216 can cause the set top box to be reset such that the settings of the set top box are restored to default settings. Additional details relating to the reset manager 216 are described below with respect to section C.

The device interface manager 218 can comprise components, subsystems, modules, scripts or one or more sets of computer-executable instructions and can be configured to manage interfacing with one or more other devices. Examples of such devices can include remote control devices, mobile devices of a guest, such as a smartphone, tablet, phablet, laptop, smartwatch or other such devices. The device interface manager 218 can be configured to control the operation of one or more communication interfaces. In some implementations, the communication interfaces can be ports, modules or other components that enable the set top box to establish connections with the other devices. In some implementations, the communication interfaces can be an infrared sensor, a Bluetooth component, a WiFi module, an Ethernet port, a USB port, among others. The device interface manager 218 can be configured to pair the set top box with the other devices. In some implementations, the device interface manager 218 can be configured to enable the set top box to communicate with a mobile phone of the guest via Bluetooth. In some implementations, the guest may install an application on the mobile phone that can be configured to pair with the set top box and enable the mobile phone to act as an input device to the set top box. In some implementations, the signals from the mobile phone can be transmitted to the set top box 210 via a wireless network, either Bluetooth or WiFi, among others.

Figure 3A:
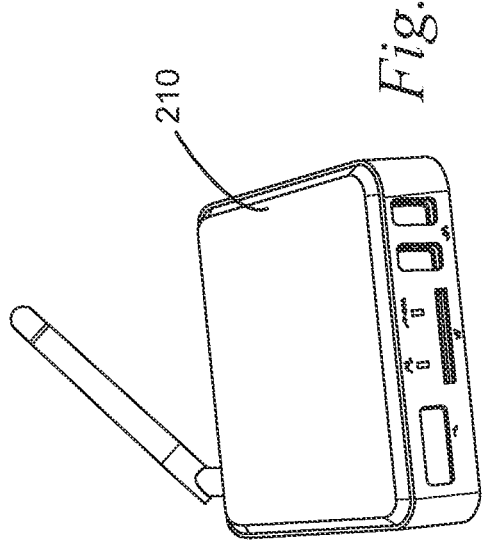
FIG. 3A depicts a perspective view of a set top box equipped in a hotel room.
Figure 3B:
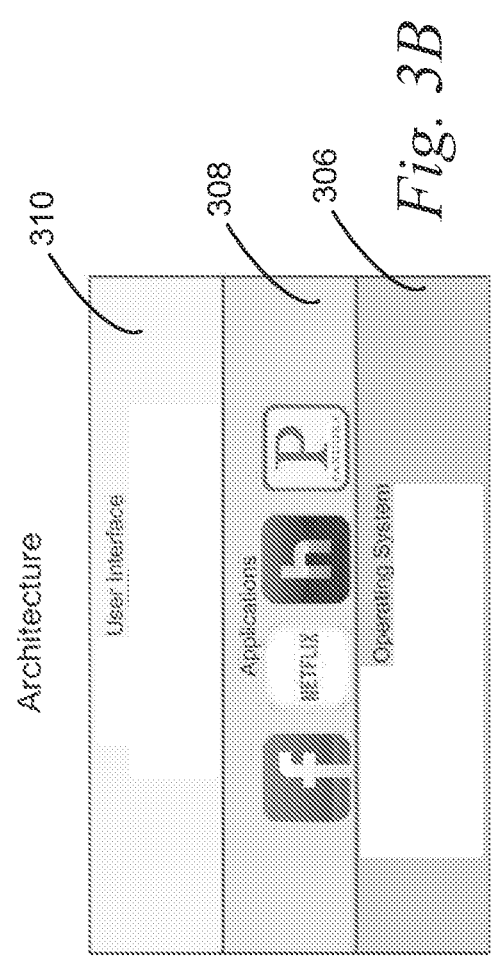
FIG. 3B illustrates software architecture of the set top box shown in FIG. 3A.

In some implementations, an input device, such as a remote control as shown in FIGS. 3A-3C may be used as an input device for the set top box. The remote control may be configured or encrypted such that the signals transmitted by the remote control can be received and decrypted by the set top box.

The cloud management system 120 can execute on one or more servers, such as the server 106 described above with respect to FIGS. 1A-1D. The cloud management system 120 includes a set top box manager 262, an application manager 264, a content selector 266 and a profile manager 268. The cloud management system 120 can include one or more modules that may perform the functionality of the set top box manager 262, the application manager 264, the content selector 266 and the profile manager 268 as well as other functionality of the cloud management system 120.

The set top box manager 262 can comprise components, subsystems, modules, scripts or one or more sets of computer-executable instructions and can be configured to manage set top boxes of hotels. The set top box manager 262 can be configured to establish communications with one or more set top boxes 210. In some implementations, the set top box manager 262 can be configured to establish respective communication channels with each set top box equipped in a hotel room of a hotel to which the cloud management system 120 provides content delivery services. In some implementations, the set top box manager 262 can be configured to receive a request from a set top box 210 via the network 105. In some implementations, the set top box manager 262 can be configured to transmit a request to establish a connection with the set top box 210. In some implementations, the set top box manager 262 can be configured to transmit a request to establish a connection with the set top box 210 in response to receiving an indication from the hotel management system 202 that a guest has been assigned to a hotel room equipped with the set top box. In some implementations, the set top box of the hotel room can be configured to transmit a request to the cloud management system 120 responsive to the set top box being switched on.

The application manager 264 can comprise components, subsystems, modules, scripts or one or more sets of computer-executable instructions and can be configured to manage one or more applications installed or deployed on set top boxes, such as the set top box 210. In some implementations, the application manager 264 can be configured to communicate with the hotel management system 202 to determine whether to provide the set top box authorization to install the application on the set top box 210. In some implementations, the application manager 206 can be configured to communicate with the hotel management system 202 to determine whether to provide the set top box the ability to access content via the application executing on the set top box 210. In some implementations, the application manager 264 can maintain a list of applications that each set top box or guest associated with the set top box is authorized to access. In some implementations, the application manager 264 can store the list in a data structure maintained in memory of the cloud management system. The list of applications can be updated by the application manager 264. In some implementations, the application manager 264 can maintain a list of applications that each guest is allowed or otherwise authorized to access based on the reservation of the guest or based on whether the guest is included in a list of guests that have authorization to access the applications.

The content selector 266 can comprise components, subsystems, modules, scripts or one or more sets of computer-executable instructions and can be configured to select content that the guest associated with the set top box 210 is authorized to access. In some implementations, the content selector 266 can identify, from a request from the set top box 210, the identity of a particular content item the guest would like to access via an application executing on the set top box 210. The content selector can also identify the application via which the guest is requesting access to the particular content item. The content selector can then establish a connection with a content server of the application and make a request to access the particular content item. The content selector can then, responsive to receiving a response from the content server, receive the content item from the content server and deliver the content item to the hotel management system. The hotel management system can then deliver the content item to the set top box for streaming via the application via which the guest requested access to the content item. In some implementations, the content selector may deliver the content item directly to the set top box for streaming. In some implementations, the content selector may establish a connection between the content server and the hotel management system 202 to enable the content server to deliver the content item to the hotel management system 202. In some implementations, the content selector may establish a connection between the content server and the set top box 210 to enable the content server to deliver the content item to the set top box 210. In some implementations, the content server of the application can, responsive to receiving the request from the content selector, establish the connection with the hotel management system 202 or the set top box 210 to deliver the requested content item.

The content selector 266 can further be configured to provide one or more applications for installation on the set top box responsive to a request from the set top box. In some implementations, the applications can be content streaming applications, games, productivity tools, or other types of applications that may execute on the set top box 210. In some implementations, the set top box can include computer-executable instructions to emulate a mobile phone or tablet such that applications available through application stores can be installed on the set top box.

The profile manager 268 can be configured to manage one or more guest profiles of guests. In some implementations, when a guest is assigned to a set top box 210, for instance, when checking into a hotel room, the guest's information can be provided to the cloud management system 120. In some implementations, the profile manager 268 can generate a profile of the guest. The profile manager 268 can record the guest's activities via the set top box, including but not limited to the applications the guest accesses, the content items the guests requests to access, as well as other online activities performed by the guest via the set top box 210. The profile manager 268 can store this information in a data structure associated with the guest. When the guest is assigned to a second set top box, for instance, during a subsequent stay at a different hotel, the profile manager 268 can access the guest's data structure and preinstall one or more applications that the guest has previously accessed as well as identify content items that are similar to content items that the guest has previously requested. In addition, the profile manager 268 can store set top box configuration settings that the guest may have set up in the past such that the guest does not have to reconfigure multiple set top boxes when staying at different rooms. In some implementations, the profile manager 268 can be configured to maintain login credentials of one or more applications such that the guest does not have to reenter the login credentials each time the guest operates a different set top box. In some implementations, the profile manager 268 can also maintain other information that may be useful to the guest as the guest stays at different hotels.

Figure 2B:
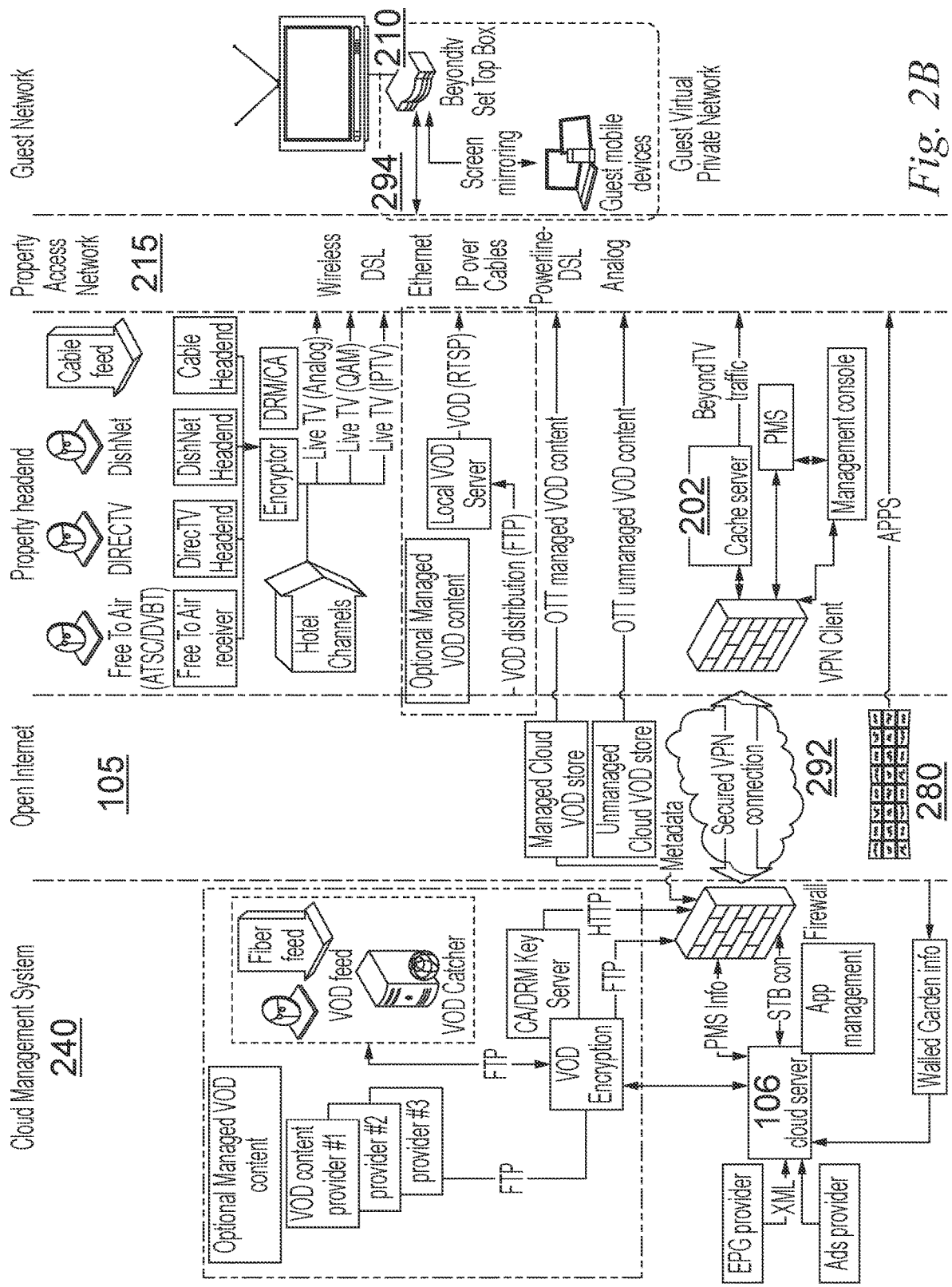
FIG. 2B is a conceptual diagram depicting an example use case for the system of FIG. 2A.

Referring now also to FIG. 2B, a diagram illustrating an environment for allocating networking resources for content delivery is displayed. The cloud management system 240 can be configured to communicate with the hotel management system 202 via a first connection 292. The first connection can be a secure connection between one or more firewalls deployed by the cloud management system 240 and the hotel management system 202. The first connection 292 can be over a virtual private network. In some implementations, the first connection 292 can be established via the Internet. In some implementations, the cloud management system 240 can be configured to transmit a request to the hotel management system to establish the first connection. In some implementations, the hotel management system 202 can be configured to transmit a request to the cloud management system to establish the first connection 292.

The hotel management system 202 can include or execute on a cache server that is configured to store traffic received from the cloud management server 240 or from one or more content servers corresponding to applications, such as applications 280. The cache server can monitor traffic to the set top boxes equipped in rooms of the hotel of the hotel management system. In some implementations, the hotel management system 202 can also include one or more additional servers that provide other content to the set top boxes. For instance, the hotel management system 202 can include servers that can provide video on demand content to the set top boxes via the hotel management system. In some implementations, hotel can include additional equipment that is configured to deliver content to set top boxes of the hotel rooms. For instance, the hotel can include property headend equipment, including but not limited to one more satellite dishes and one or more cable lines for delivering broadband internet and television media, among others.

The set top boxes 210 equipped in rooms of the hotel can be configured to communicate with the hotel management system 202 via a second connection 294 established via the property access network or hotel network 215. The set top boxes can include a communication interface, such as an Ethernet port or wireless radio modules through which the set top boxes can communicate with the hotel management system or one or more servers corresponding to the hotel management system. In some implementations, the set top boxes can include one or more additional communication interfaces with which the set top boxes can communicate with mobile devices of guests, such as mobile phones and tablets. In some implementations, the set top boxes can be configured to establish connections with the mobile devices of guests over a guest network that is accessible by mobile devices of guests. In some implementations, the set top boxes can communicate via short range connections, such as Bluetooth, among others. In some implementations, the guest network that is accessible to mobile devices of guests may have reduced bandwidth preventing or compromising the quality of content streamed over the guest network. The set top box, however, is capable of communicating with the hotel management system via the hotel network 215 that provides higher throughputs and bandwidth than the guest network. As a result, guests can access and stream content via the set top box without experiencing latency issues that are apparent over the guest network.

FIG. 3A depicts a perspective view of a set top box equipped in a hotel room. The set top box can include multiple ports and communication interfaces. FIG. 3B illustrates a software architecture of the set top box shown in FIG. 3A. The software architecture includes a first layer 306 representing the operating system of the set top box. The operating system can be a specialized operating system configured to execute applications on the operating system. The software architecture includes a second layer 308 representing the application layer. The application layer includes one or more applications installed on the operating system. The applications can include content streaming applications as well as social media applications. The software architecture also includes a third layer 306 representing the user interface layer. The third layer sits on the second layer 308 and provides a user interface through which a guest can interact with the set top box. In some implementations, the third layer can be customized for the hotel at which the set top box is located. The third layer can include user interface elements, including but not limited to logos, images, sounds, videos, and themes corresponding to the hotel. In some implementations, the third layer can allow a hotel to white label the set top box and the user interface. FIG. 3C illustrates a front view 354 and a back view 356 of an input device 350 configured to operate with the set top box shown in FIG. 3A. The front 354 of the input device includes an application button that can be used to access a page on which applications installed on the set top box are presented for display. The back 356 of the input device can include a keyboard for typing.

FIG. 3D illustrates one or more modules of the input device 350 shown in the FIG. 3C. The input device 350 can include a delete button 358. The delete button can cause the input device to send a signal to the set top box 210 to erase the activity data of the guest accessing the set top box. The input device includes a reset trigger 362 that is activated when the delete button 358 is engaged. The reset trigger sends the signal to the set top box 210 to erase the activity data of the guest accessing the set top box. The set top box, upon receiving the signal, can delete activity data pertaining to the guest from the set top box. The input device 350 also can include a tracking signal module 364. The tracking signal module 364 can be configured to detect tracking signals generated within a predefined location within which the input device is designed to work. The tracking signal can be generated by the set top box and can be unique to the input device. The tracking signal module 364 can be configured to periodically or constantly monitor for the tracking signal. The tracking signal module 364 can be configured to generate an alarm 366 if the tracking signal module cannot detect the tracking signal. In some implementations, the tracking signal module 364 can be configured to generate an alarm if the input device moves to a location outside the predefined location within which the tracking signal can be detected. In some implementations, the tracking signal can be generated by one or more signal generators positioned within a hotel room in which the set top box is located. In some implementations, the alarm can be an audio alarm, a visual alarm, a haptic alarm, or a combination of one or more. The alarm can include an audio output device, a visual output device or a haptic output device.

In some implementations, the input device can include an deactivation module 368 that deactivates the input device rendering the input device nonfunctional. The deactivation module can be triggered responsive to the tracking signal module being unable to detect the tracking signal. In this way, the input device cannot function if the device 350 is taken to a location outside the predefined area. In this way, the input device can be rendered nonfunctional in the case of theft.

Figure 4A:
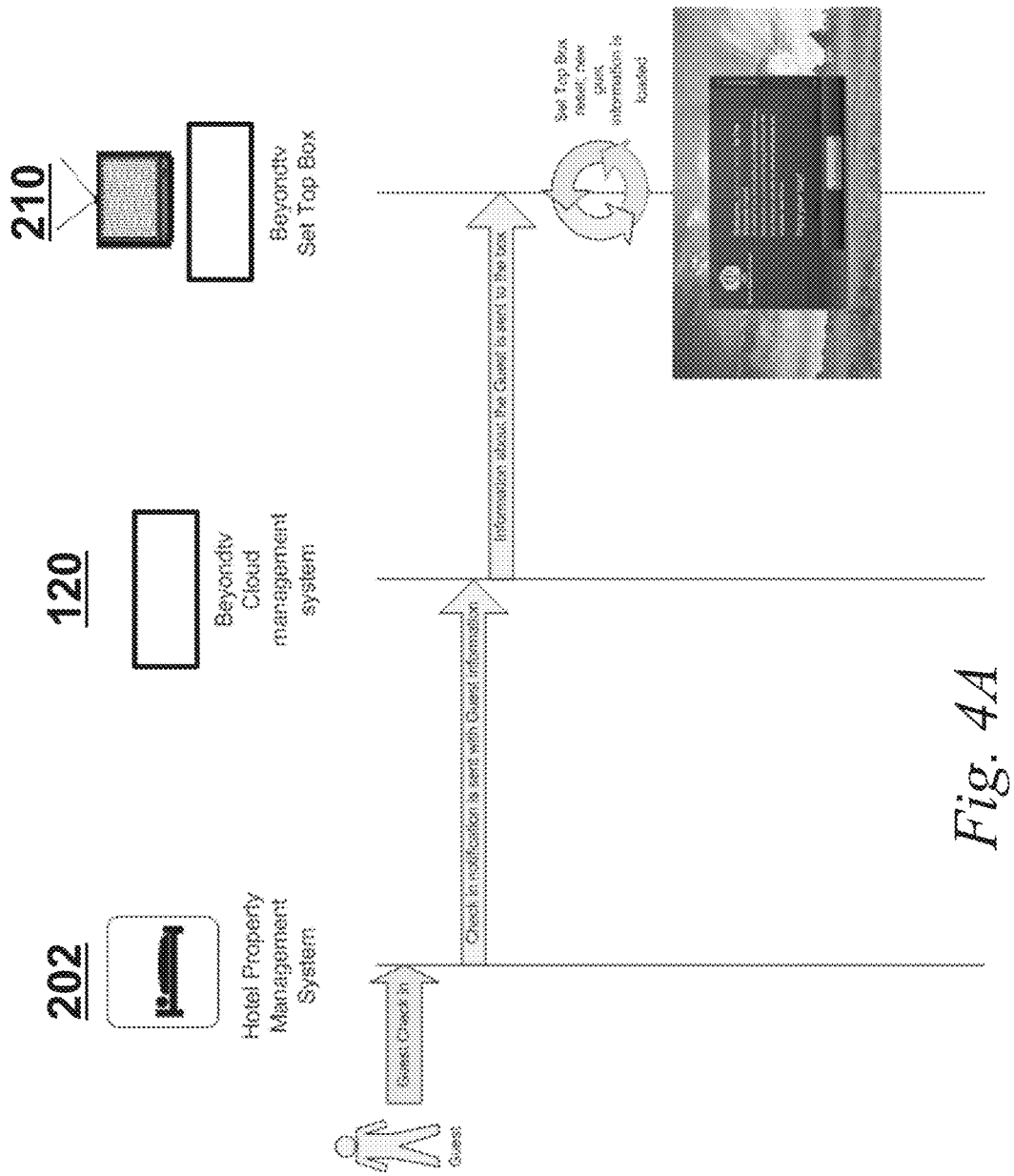
FIG. 4A illustrates a flow diagram of a flow of communications during a guest check in process.

Referring now to FIG. 4A, a flow diagram illustrating a flow of communications during a guest check in process is shown. When a guest checks into the hotel via the hotel management system 202, the hotel management system 202 can be configured to generate and transmit a request to the cloud management system 120 indicating that a guest has checked in. The request can identify a room number of the hotel to which the guest has checked in, a corresponding set top box identifier corresponding to the room, a guest identifier identifying the guest, among other information. In some implementations, the request can also include information relating to the guest's ability to access content or applications via the set top box based on whether the guest has subscribed for the content delivery service of the cloud management system.

The cloud management system 120 can receive the request from the hotel management system 202. The cloud management system 120 can identify the set top box equipped in the room to which the guest is assigned. In some implementations, the cloud management system 120 can perform a lookup in a data structure for the set top box based on the room to which the guest is assigned. The cloud management system 120 can then generate and send a request to the set top box 210 to configure the set top box. In some implementations, the request to configure the set top box can include guest profile information maintained by the profile manager 268 of the cloud management system 120.

The set top box 210 can receive the request to configure the set top box 210 from the cloud management system 120. The set top box 210 can execute the request via the request manager 212. In some implementations, the request manager can be configured to configure the set top box by first resetting the set top box to its default settings. In some implementations, the set top box can previously have been reset when the previous guest checked out. In some implementations, the set top box 210 can be configured to load the guest information received from the cloud management system 120 and in some implementations, install one or more applications based on the guest profile information included in the request. In some implementations, the request from the cloud management system can identify whether the guest is eligible to access one or more applications or to receive content via the applications based on whether the guest signed up for the content delivery service at the time of reservation or check-in.

Figure 4B:
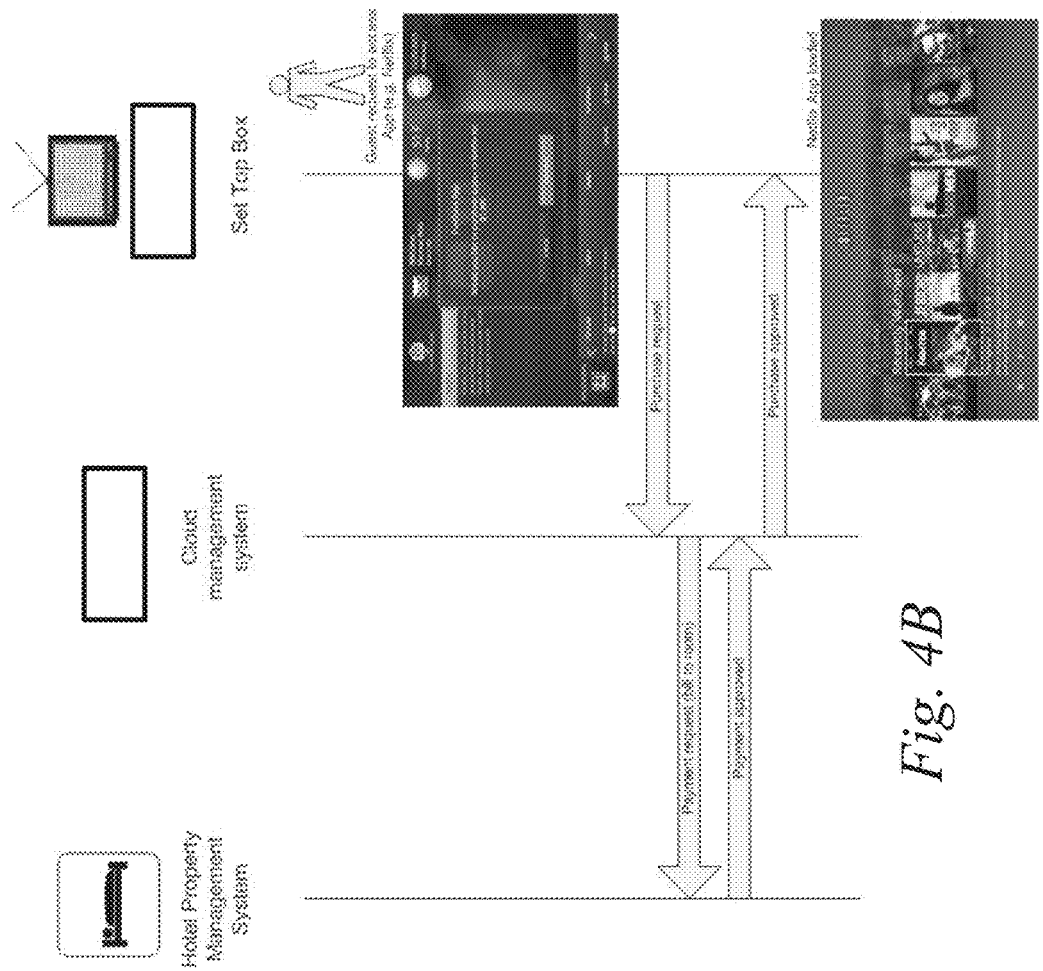
FIG. 4B illustrates a flow diagram of a flow of communications when a guest requests access to an application via the set top box.

Referring now to FIG. 4B, a flow diagram illustrating a flow of communications when a guest requests access to an application via the set top box is shown. Once the set top box is configured responsive to the guest checking into to the hotel and being assigned a room, the guest may access the set top box. The guest may operate the set top box 210 via the input device shown in FIG. 3C. The guest can request to access an application via the set top box. In some implementations, the application can be installed on the set top box. In some implementations, the application may not be installed on the set top box but the guest can request access to the application via a user interface of the set top box 210. The set top box 210 can prompt the guest to provide information regarding the request to purchase access to the application. The information can include payment information or instructions to authorize charging the guest for the service at the time of checkout. In some implementations, the request can be to access the application for the entire stay of the guest or for an allotted amount of time during which the guest can access the application. In some implementations, the request can be to access multiple applications for a predetermined amount of time. In some implementations, the request can be to purchase access to the application to view or stream a particular content item. In some implementations, the request can be to purchase authorization to receive or transmit a predetermined amount of data, for example, 1 GB of data via the set top box. In some implementations, the request can be to purchase authorization for a predetermined amount of time, for instance, 2 hours, among others. In some implementations, the guest may include an authorization code or login credentials that can be sent to the hotel management system to validate that the guest has requested access and to charge the guest for the purchase.

The set top box can generate the request to purchase access to an application and transmit the request to the cloud management system via the second connection established between the cloud management system 120 and the set top box 210. The cloud management system 120 can receive the request, parse the information from the request and generate and transmit another request to the hotel management system 202 via the first connection established between the hotel management system 202 and the cloud management system 120. This request can include a request to bill the guest as well as any information that can be used to validate that the guest requested to purchase access to the application.

Responsive to the hotel management system receiving the request, the hotel management system can determine if the request includes information validating that the guest requested to purchase access to the application. The hotel management system 202 can compare the login credentials or other validating information to information on file and responsive to determining that the information matches, the hotel management system 202 can authorize payment for the request to purchase access. The hotel management system 202 can then transmit a request approving the payment to the cloud management system 120.

The cloud management system can then generate a request indicating that the payment was approved and providing authorization information that the set top box 210 can use to install the application and/or to access content via the application for which access was purchased. In some implementations, the set top box can then allow the guest to launch the application for which access was purchased. Once the application is launched, the guest can request content to access via the application.

Figure 11:
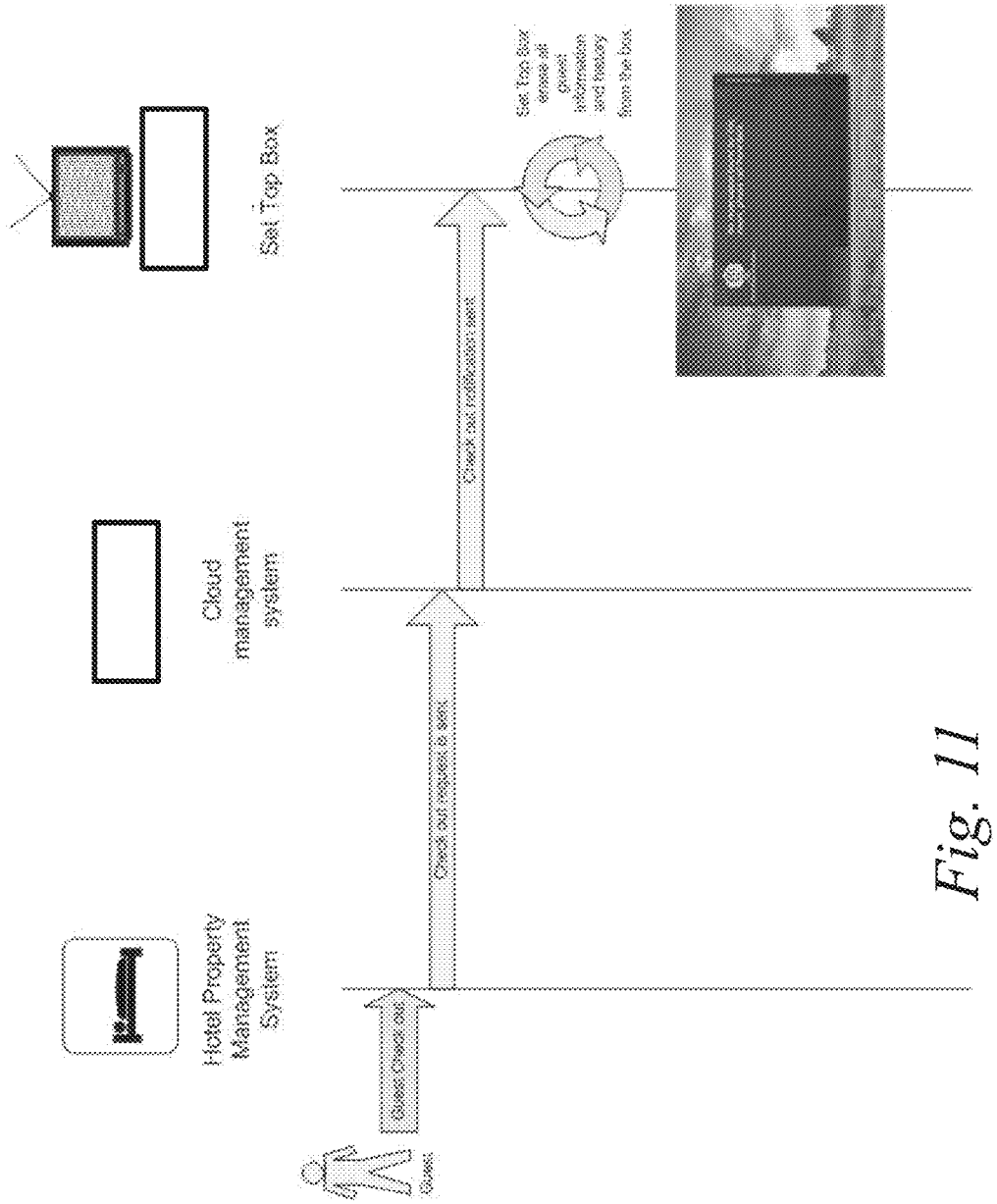
FIG. 11 illustrates a flow diagram of a flow of communications during a guest check out process.
Figure 12:
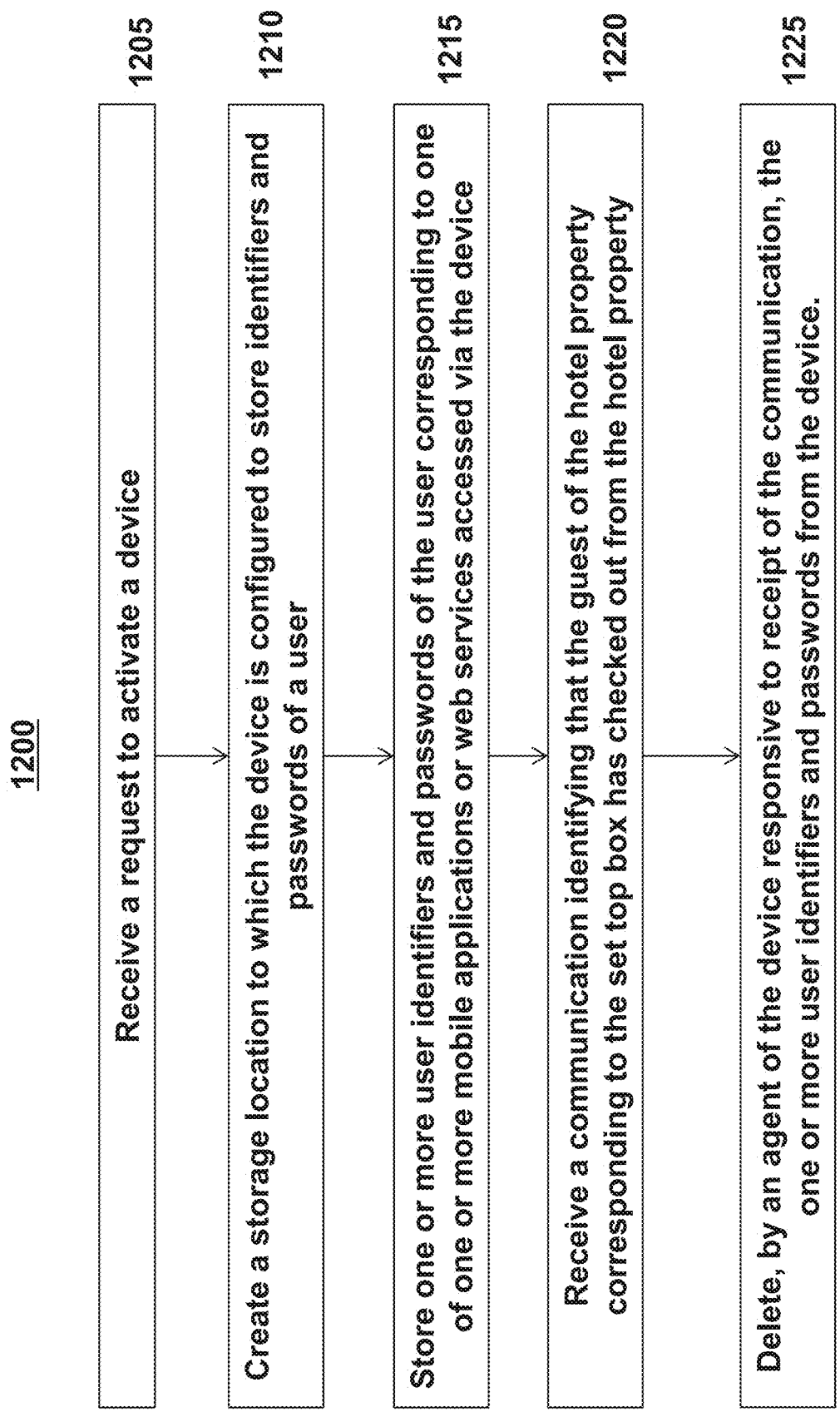
FIG. 12 illustrates a flow chart of a process for automatically erasing content stored on a remote set top box via a hotel management system.

Referring now to FIG. 11, a flow diagram illustrating a flow of communications during a guest check out process is shown. At the time of checkout, the hotel management system 202 can begin the checkout process. In some implementations, a guest may initiate the checkout process via the set top box equipped in the room the guest was assigned to. In some implementations, the guest may initiate checkout by approaching the front desk or reception counter. Responsive to the hotel management system 202 receiving an indication that the guest is checking out, the hotel management system 202 transmits a checkout request to the cloud management system 120. The cloud management system 120 receives the request and initiates a checkout routine. The cloud management system 120 can transmit a checkout notification to the set top box assigned to the guest at the time the guest checked in. The set top box 210 may receive the request and may initiate a reset routine. In some implementations, the reset manager 216 of the set top box 210 may execute the reset routine. The reset routine can cause the set top box to erase all of the guest's stored information that is stored in the memory of the set top box 210. In some implementations, the reset routine can cause the set top box 210 to be configured to default settings, which can include erasing all data, files, and instructions stored in one or more folders of one or more applications installed on the set top box 210. In some implementations, the set top box can also uninstall one or more applications that the guest accessed during the guest's stay.

Figure 5A:
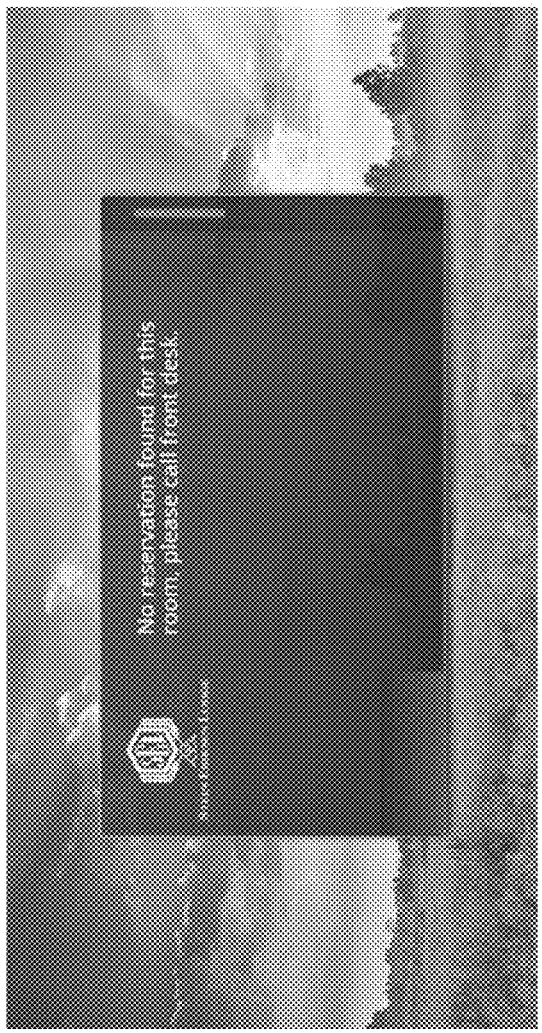
FIGS. 5A-5X are screenshots of a display on which a user interface of the set top box is displayed.
Figure 5B:
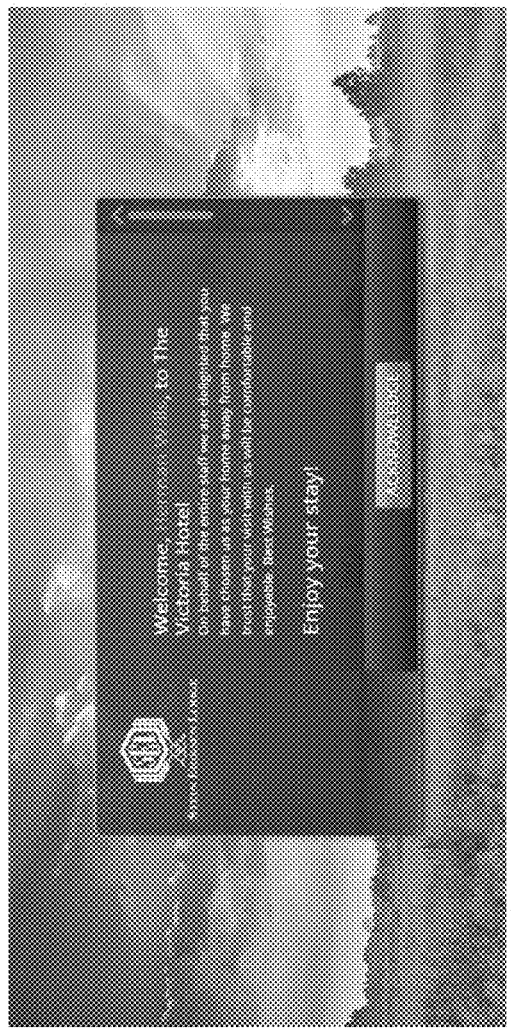
Figure 5C:
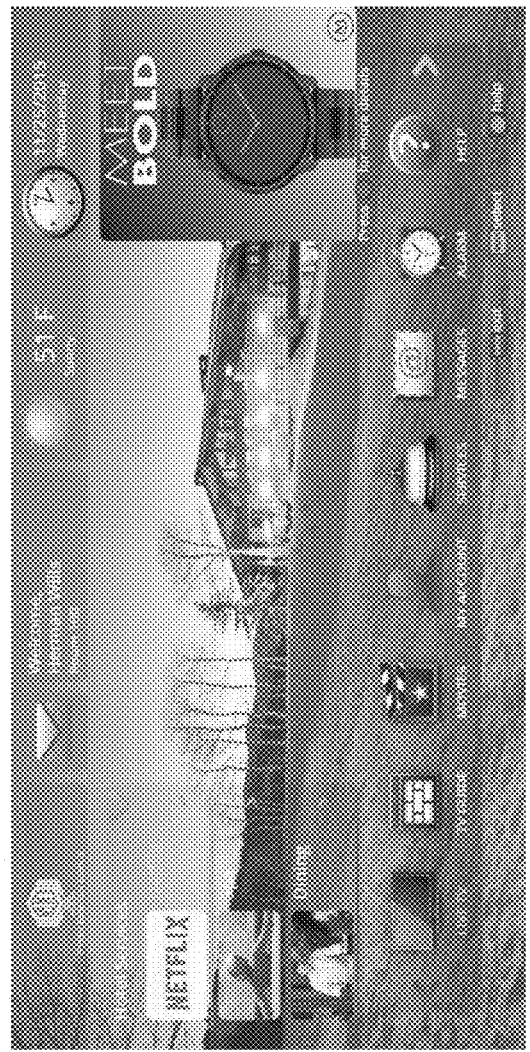
Figure 5D:
Figure 5E:
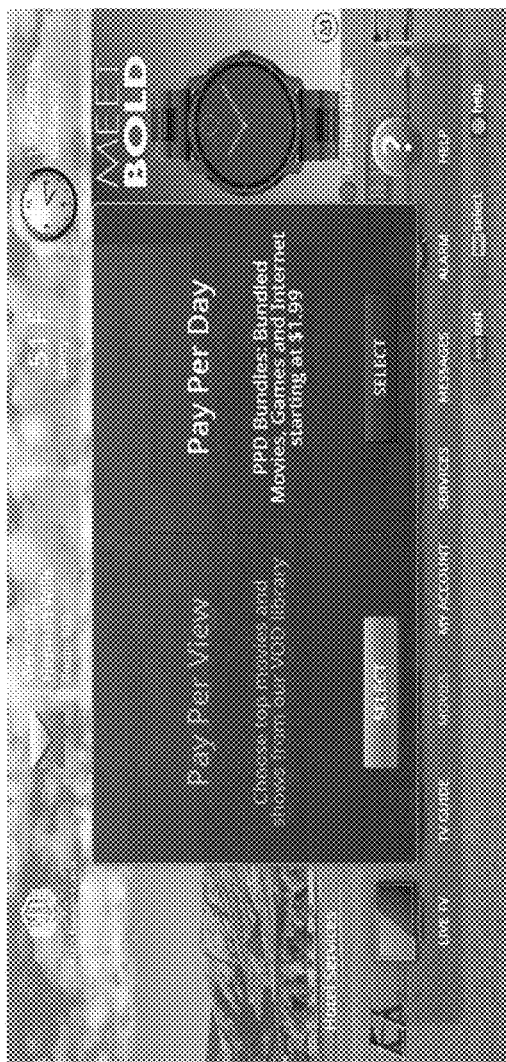
Figure 5F:
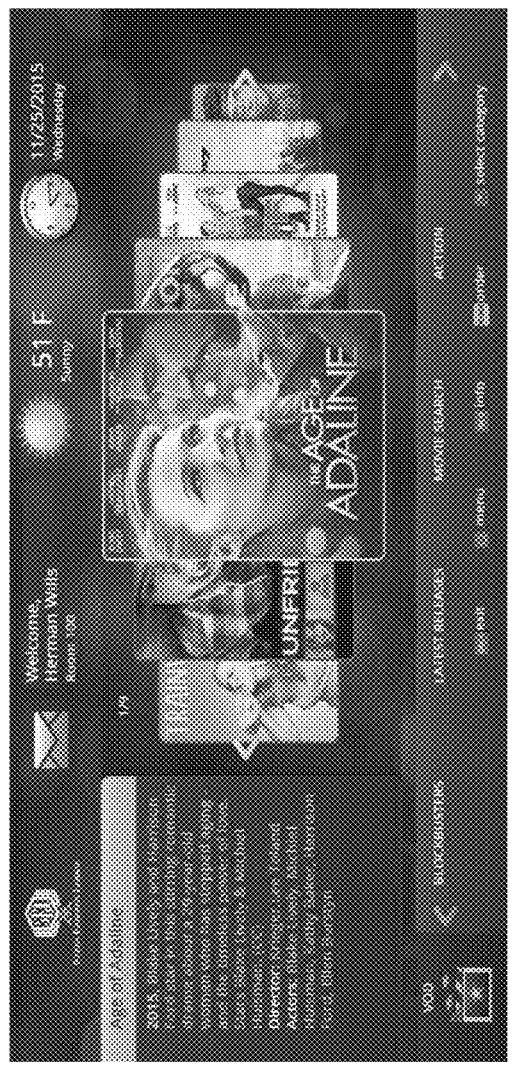
Figure 5G:
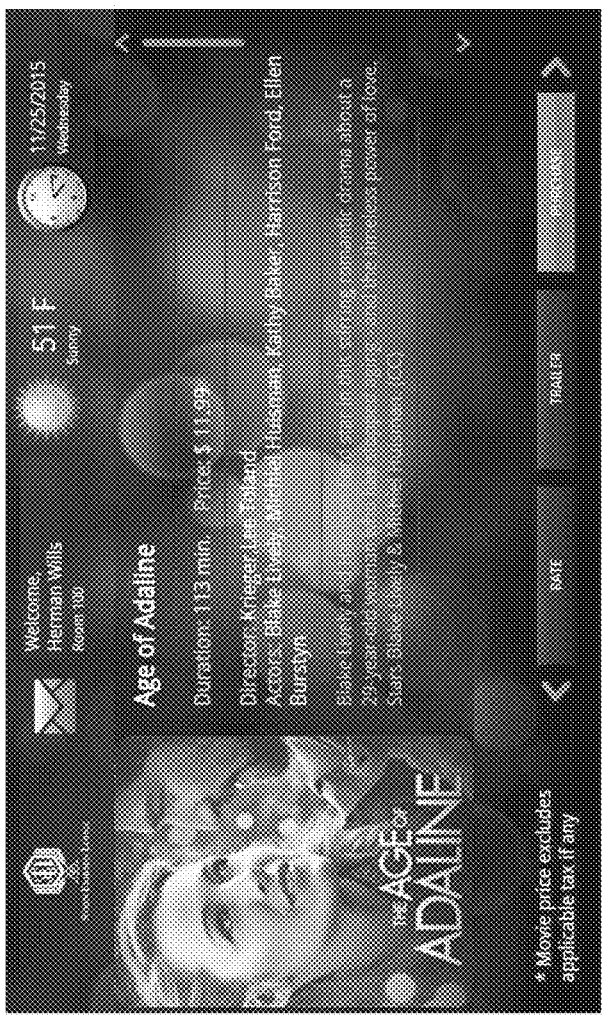
Figure 5H:
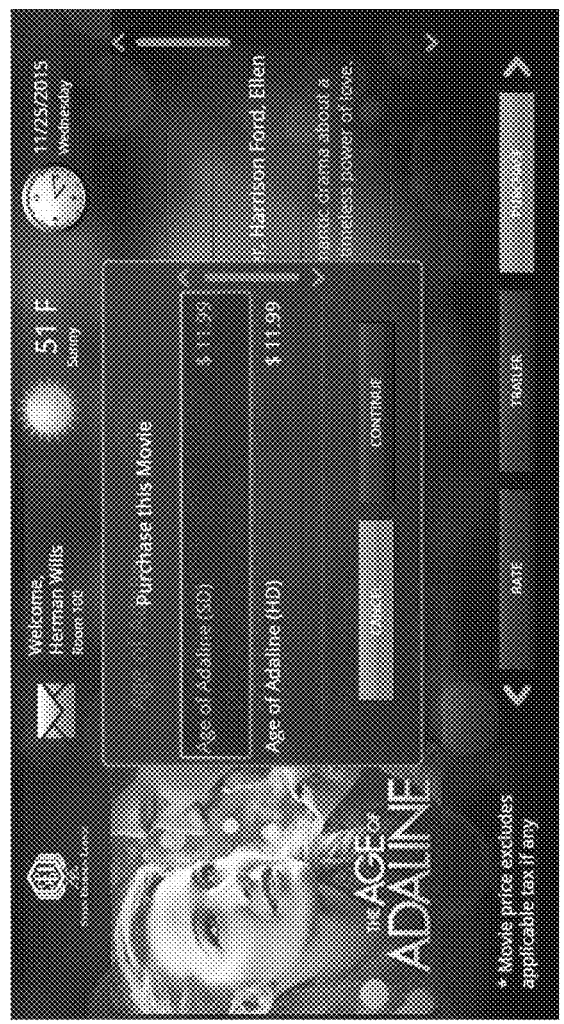
Figure 5I:
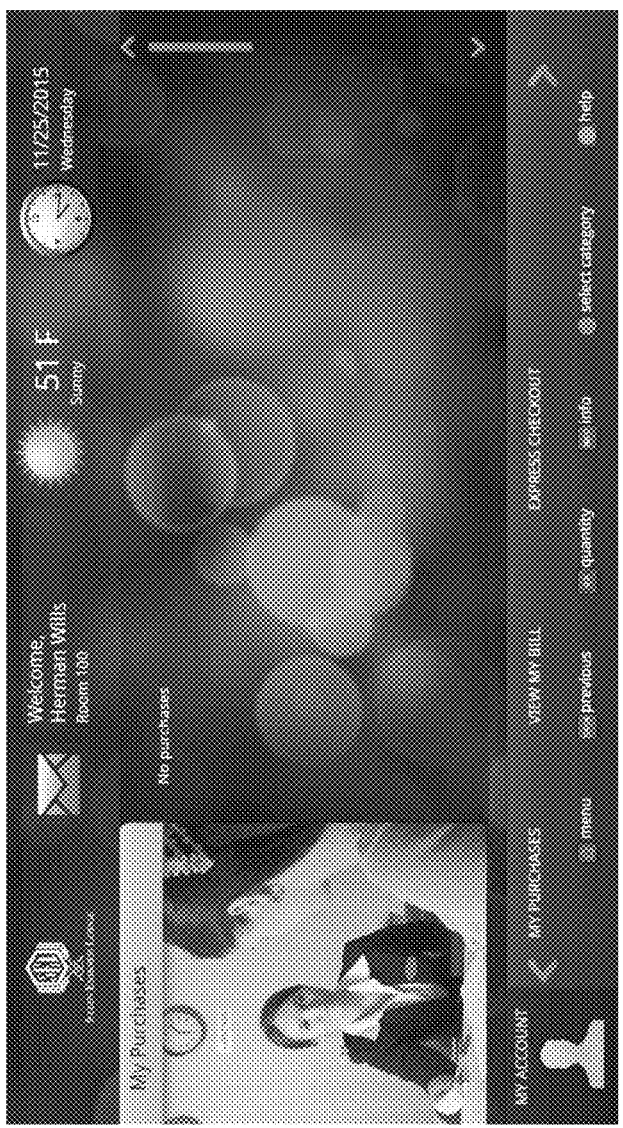
Figure 5J:
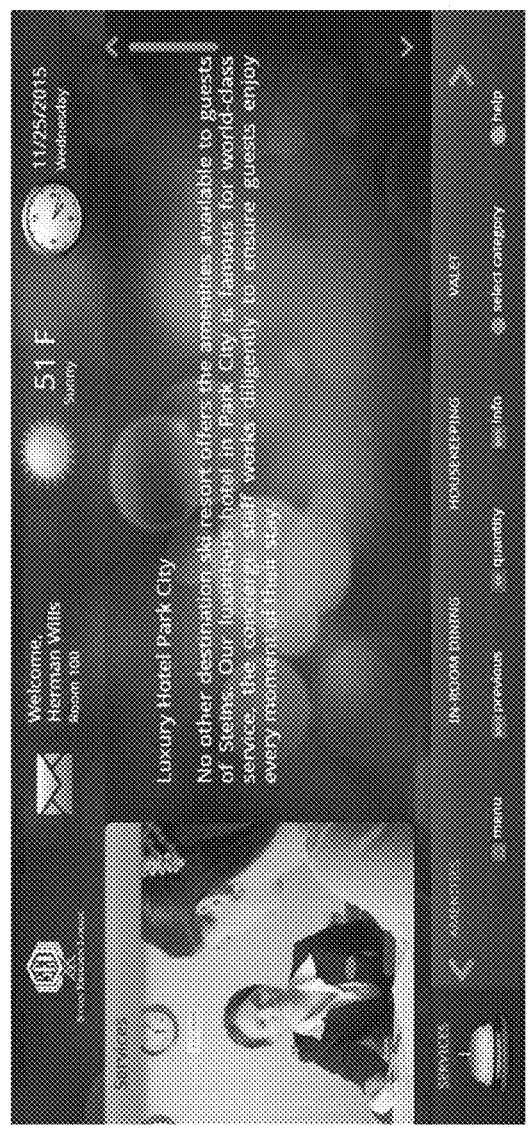
Figure 5K:
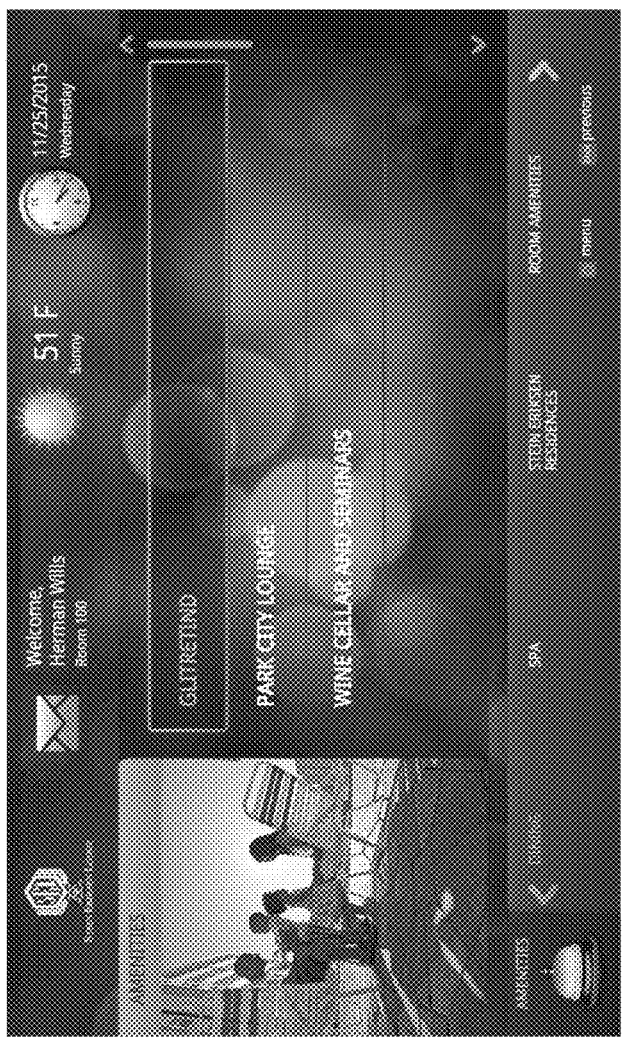
Figure 5L:
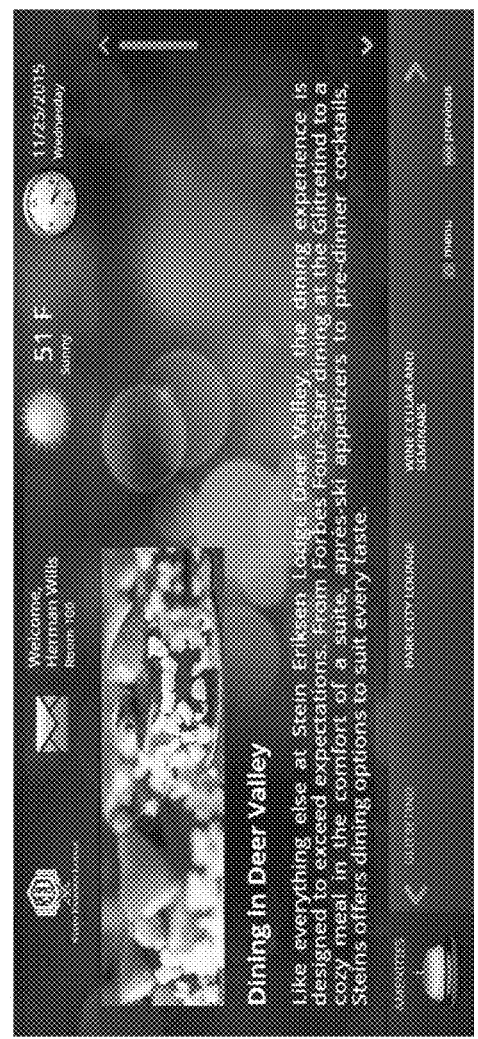
Figure 5M:
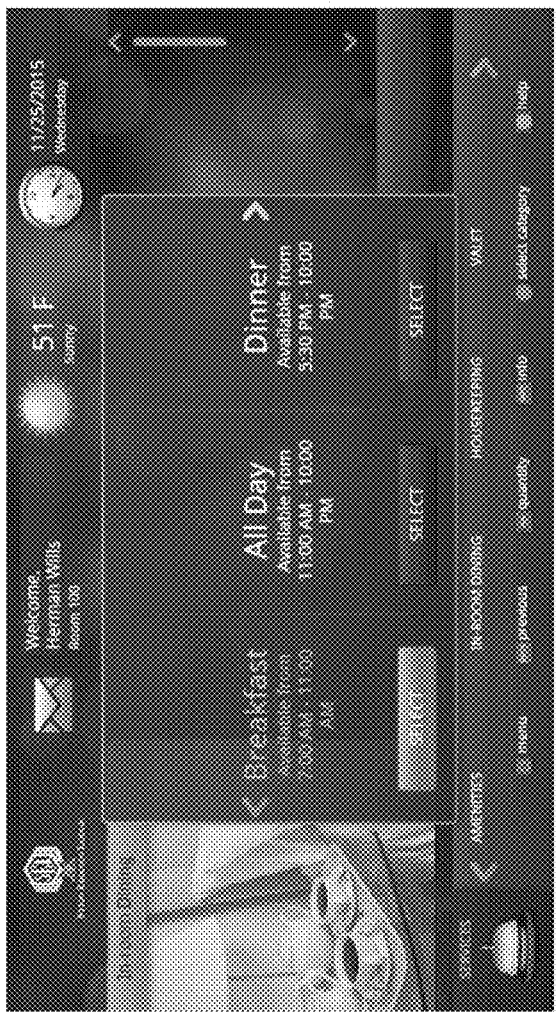
Figure 5N:
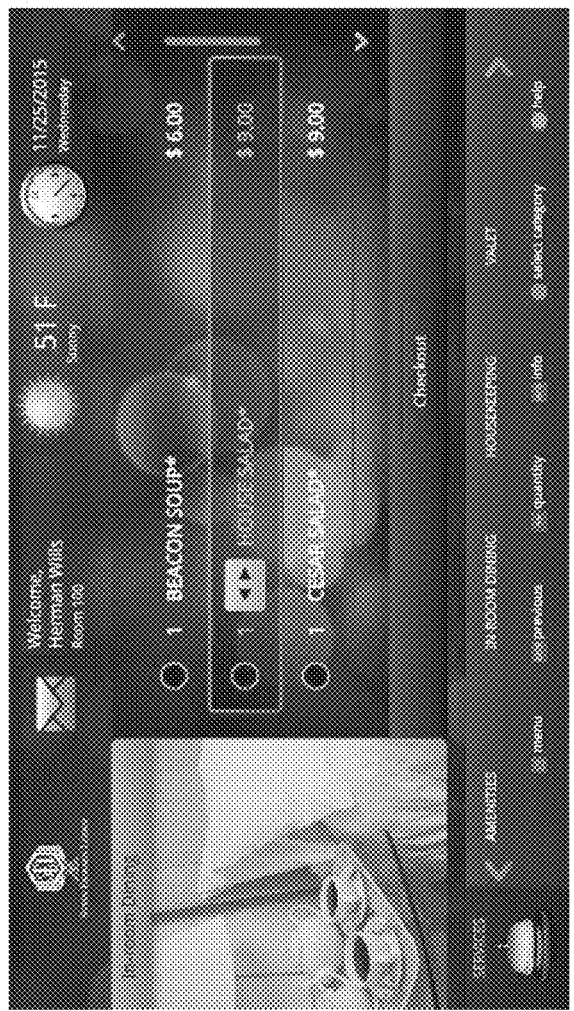
Figure 5O:
Figure 5P:
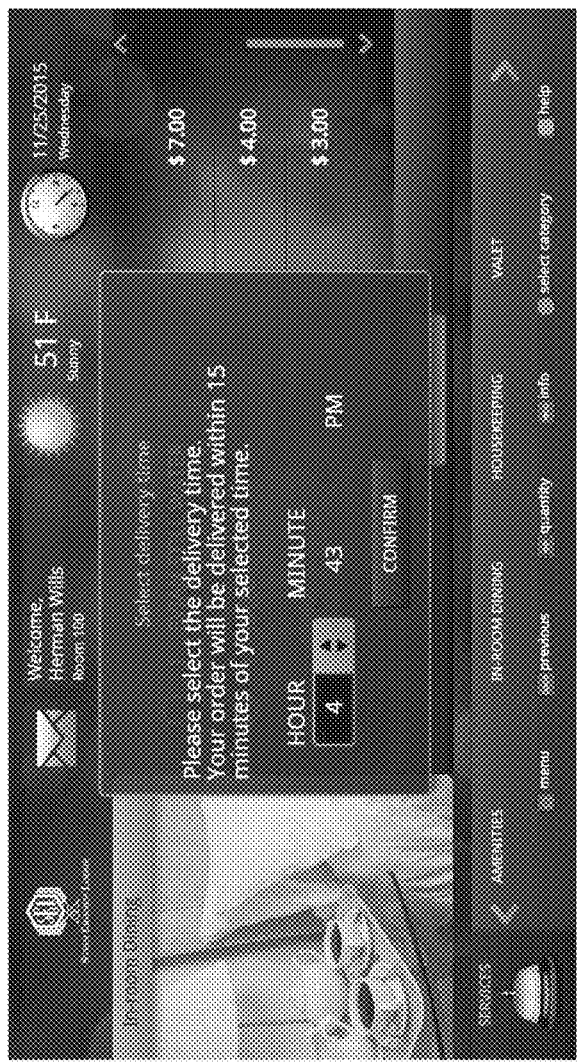
Figure 5Q:
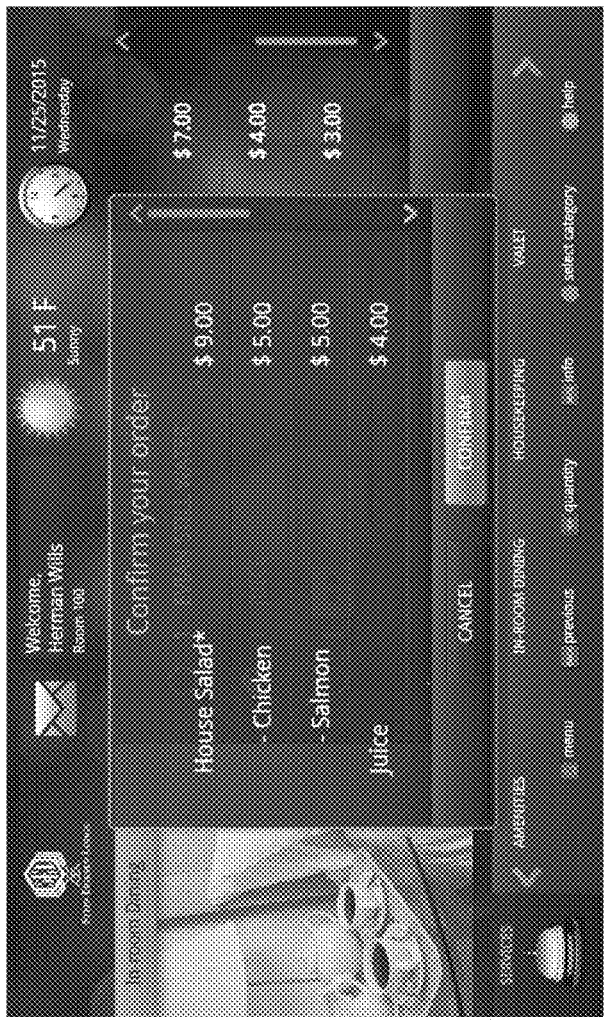
Figure 5R:
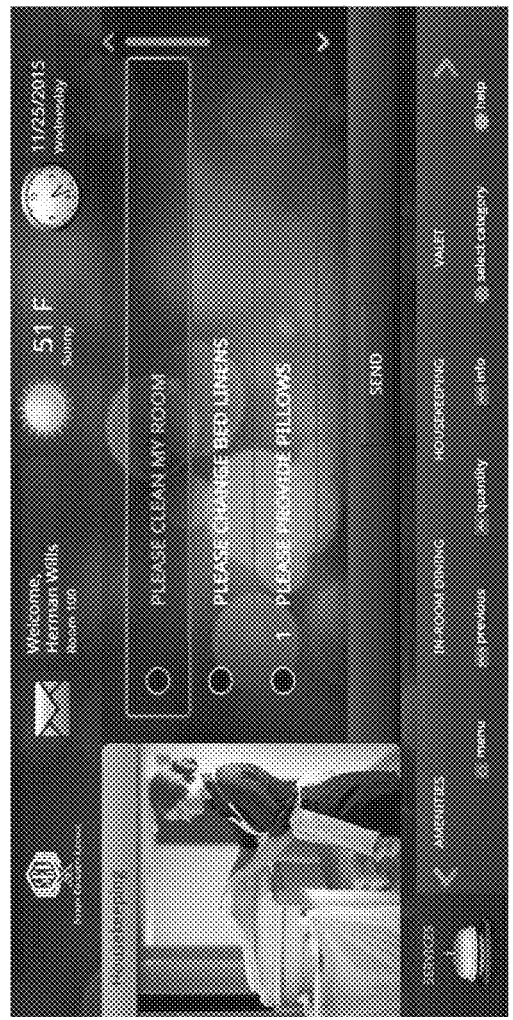
Figure 5S:
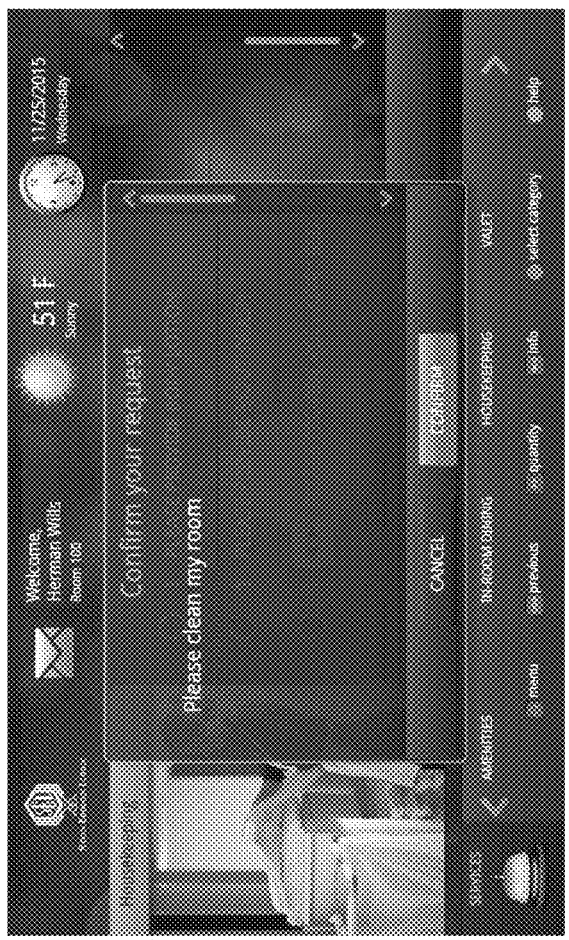
Figure 5T:
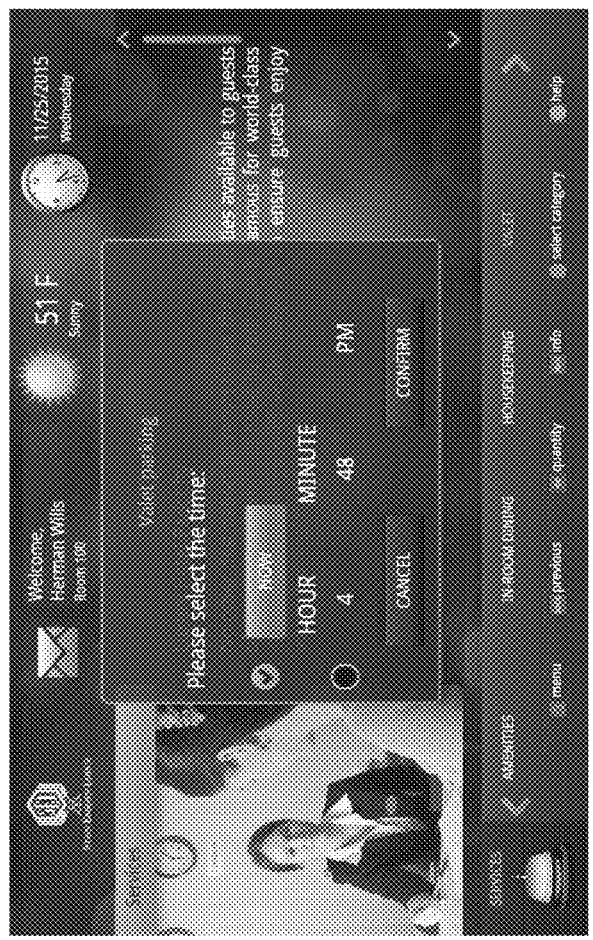
Figure 5U:
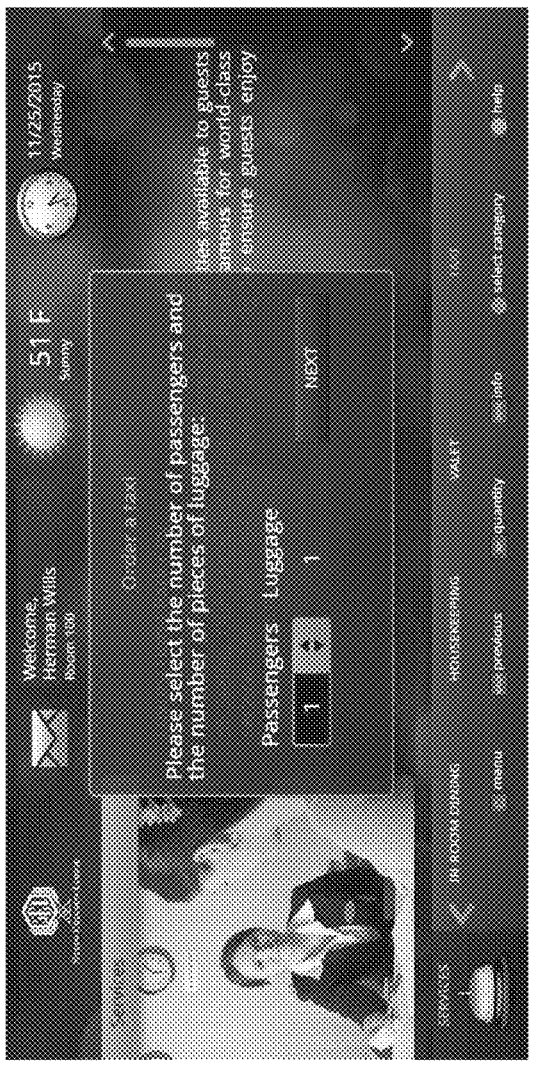
Figure 5V:
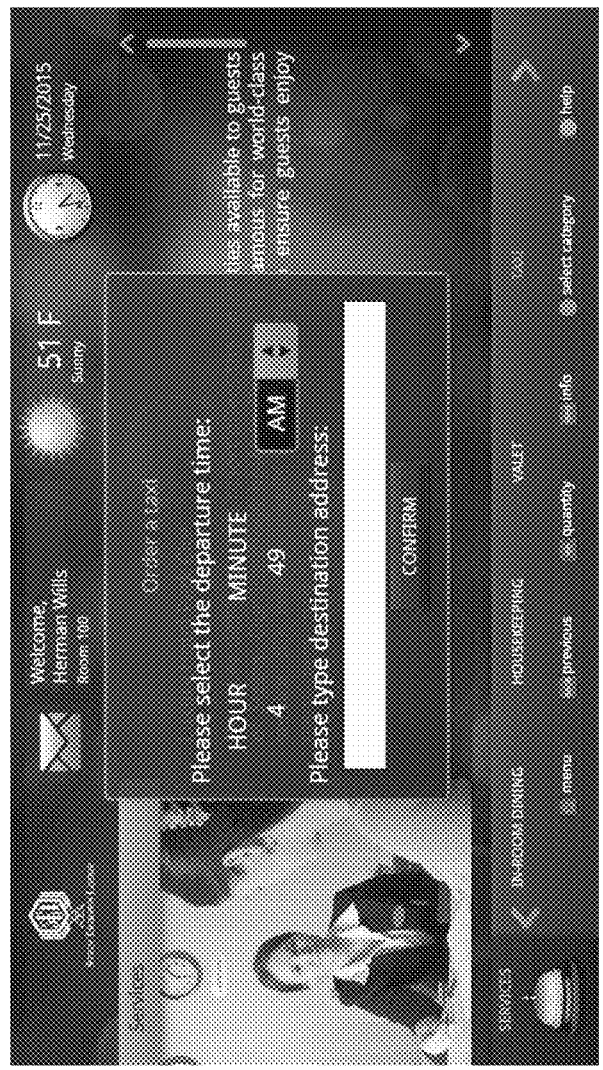
Figure 5W:
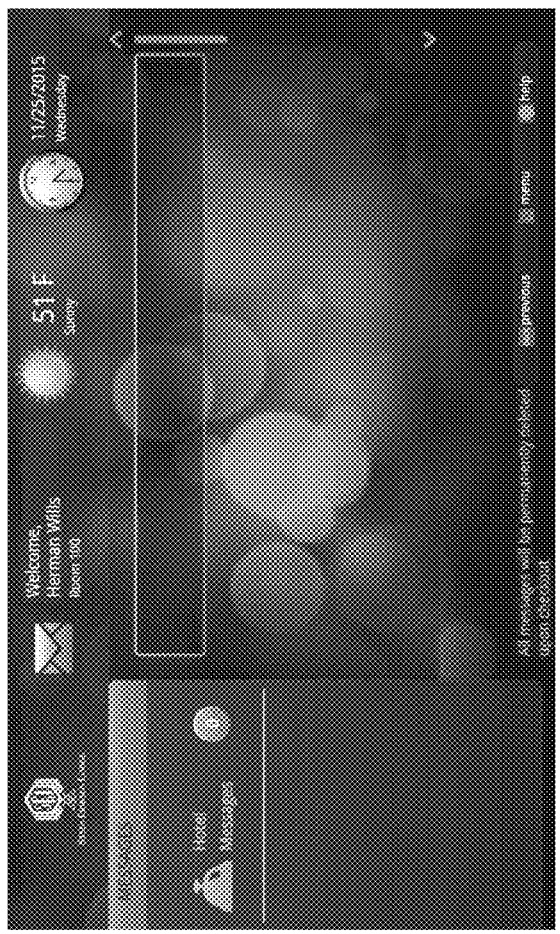
Figure 5X:
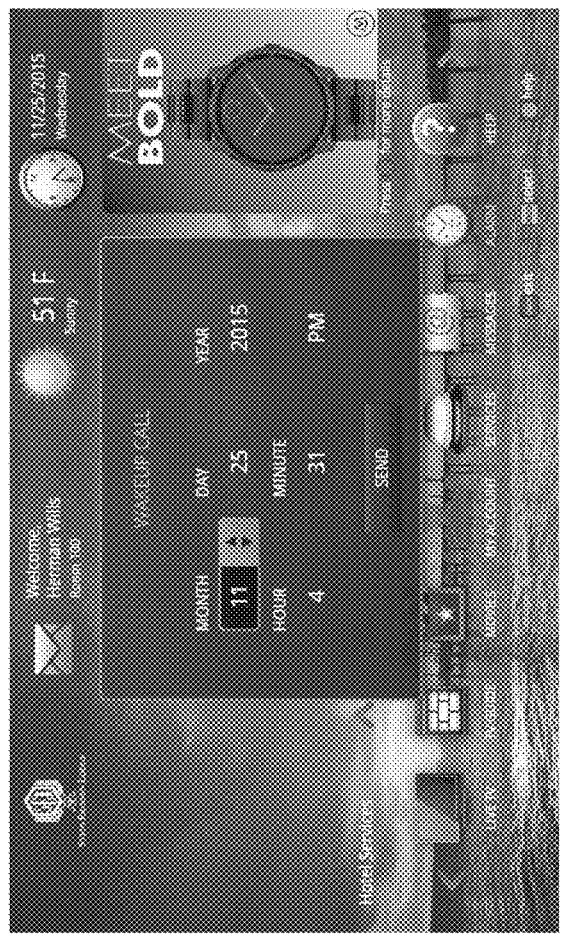

FIGS. 5A-5X include screenshots of a display on which a user interface of the set top box is displayed. The screenshot shown in FIG. 5A is displayed when no guest is assigned to a room in which the set top box is located. The screenshot shown in FIG. 5B is displayed when a guest assigned to a room in which the set top box is located first accesses the set top box. The screenshot shown in FIG. 5A is a home screen including a plurality of selectable icons to access various services and applications. The home screen also provides relevant information to the guest. The home screen also provides various services offered by the hotel, including an alarm service or wakeup call service, housekeeping, room service, live TV service, as well as content streaming services. The screenshot shown in FIG. 5D is displayed when the guest accesses live TV.

The screenshot shown in FIGS. 5E-5H are displayed when the guest requests to access content from a video on demand service of the hotel. The screenshot shown in FIG. 5I shows recent purchases and order history of the guest. The screenshots shown in FIG. 5J-5K show services or amenities that can be ordered via the set top box. The screenshot shown in FIG. 5L-5Q show dining ordering capabilities via the set top box. The screenshot shown in FIG. 5R-5T show housekeeping request capabilities via the set top box. The screenshot shown in FIG. 5U-5V show taxi ordering capabilities via the set top box. The screenshot shown in FIG. 5W shows messages from the hotel via the set top box. The screenshot shown in FIG. 5X shows wake up call ordering capabilities via the set top box.

It should be appreciated that the set top box can be configured to communicate with the hotel management system to transmit the various types of requests submitted by guest. The hotel management system 202 can then route the requests to the appropriate department of the hotel to execute or fulfill those requests. By way of the set top box, the hotel can reduce the number of calls made to guest services and in turn improve customer service. Guests no longer have to wait for agents to be available to take the call, there are less chances of errors due to misunderstandings between the agent and the guest, the guest can maintain privacy, among other benefits. As a result, the hotel can save costs by reducing the number of agents to field calls from guests, as well as automate various functions such as housekeeping scheduling, wake up calls, among others.

Figure 6A:
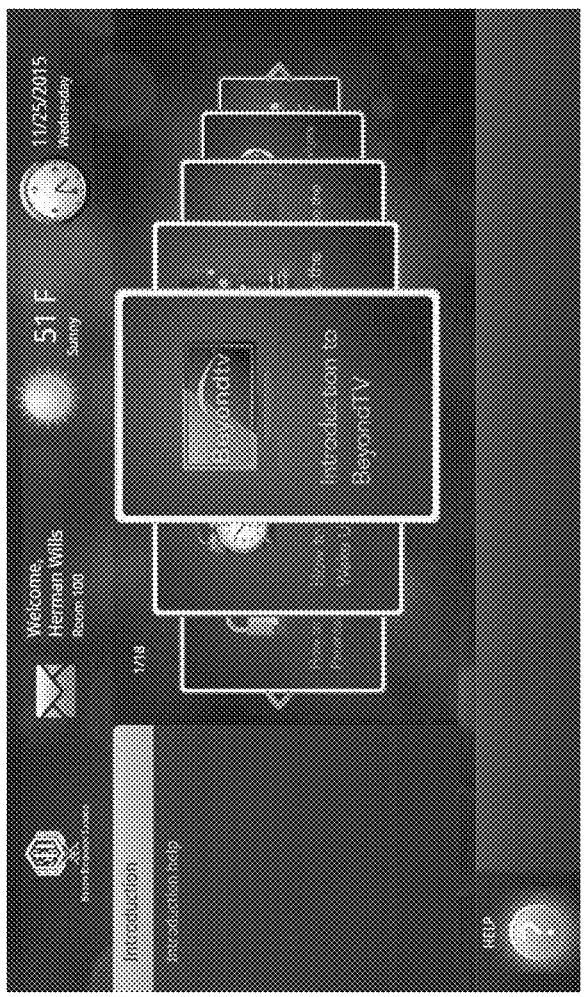
Figure 6B:
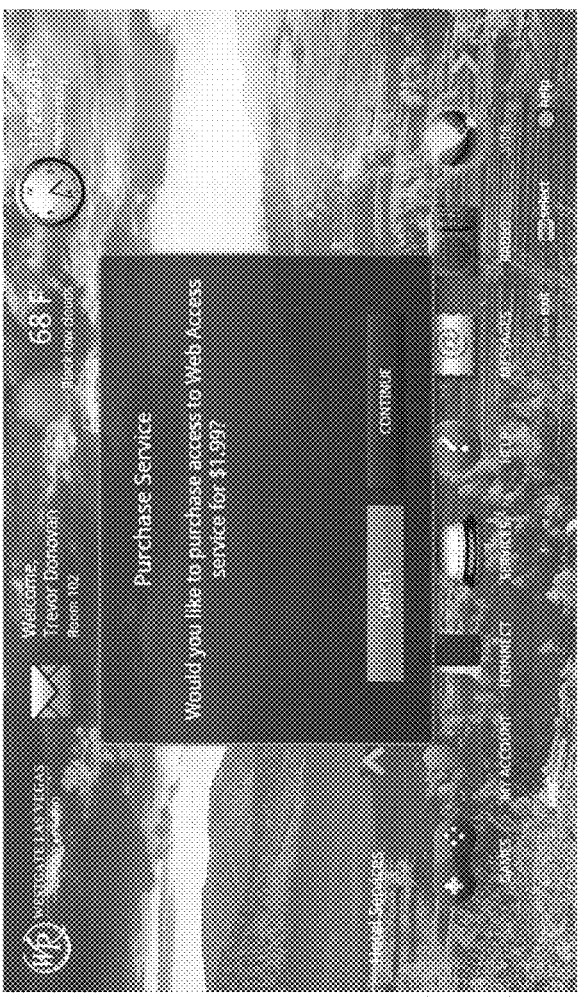
Figure 6C:
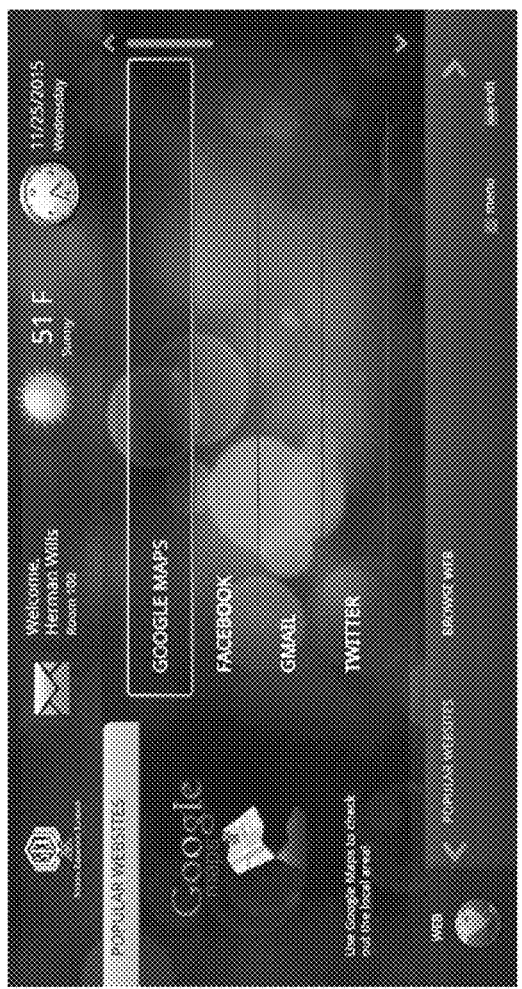
Figure 6D:
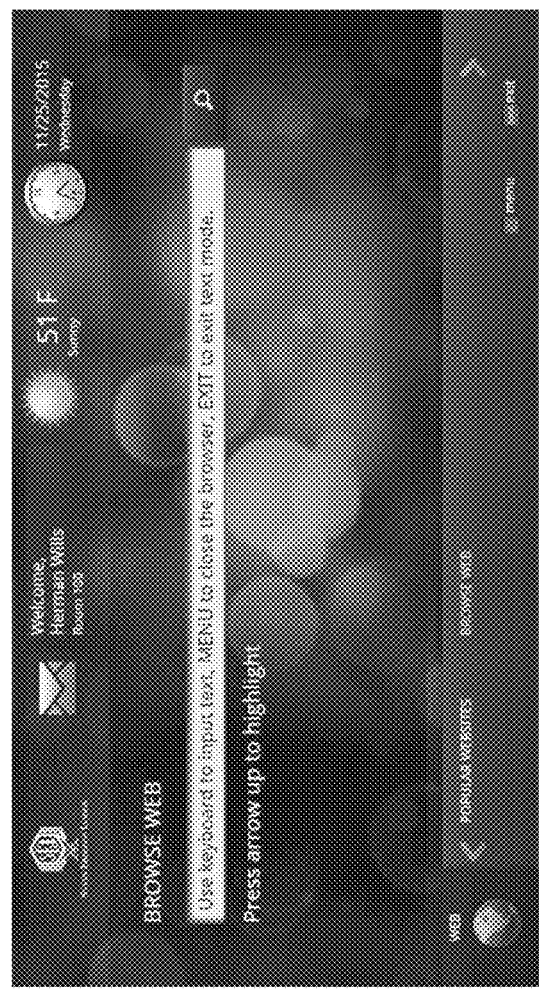
Figure 6E:
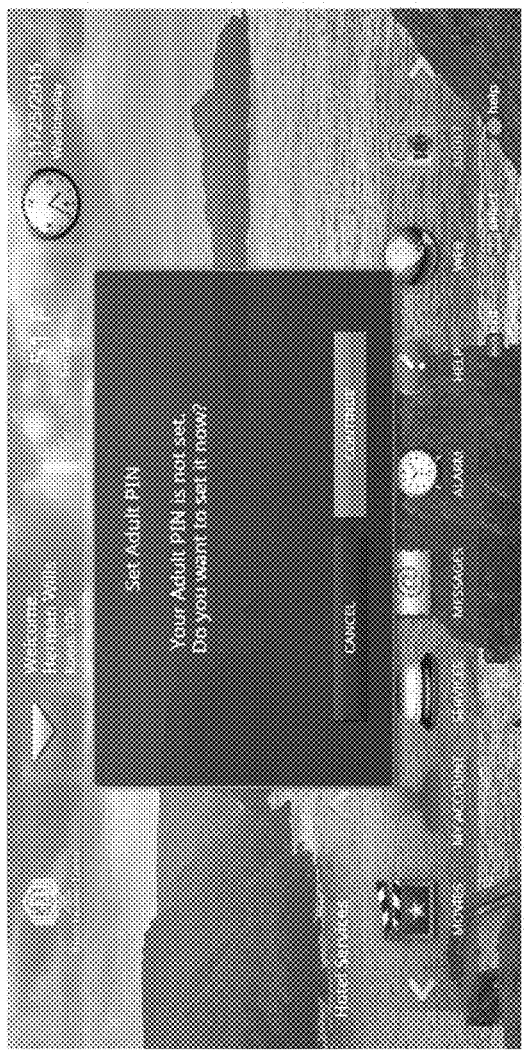
Figure 6F:
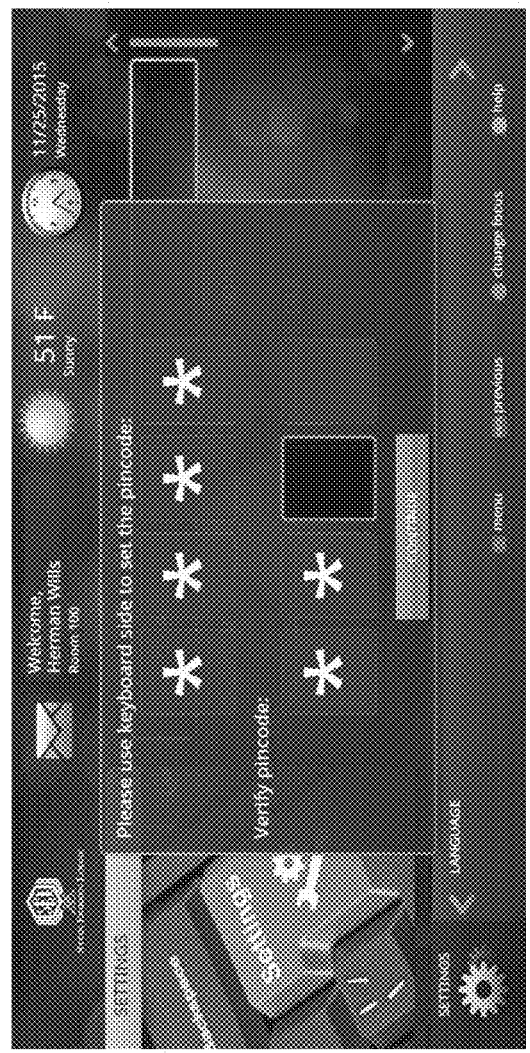
Figure 6I:
Figure 6J:
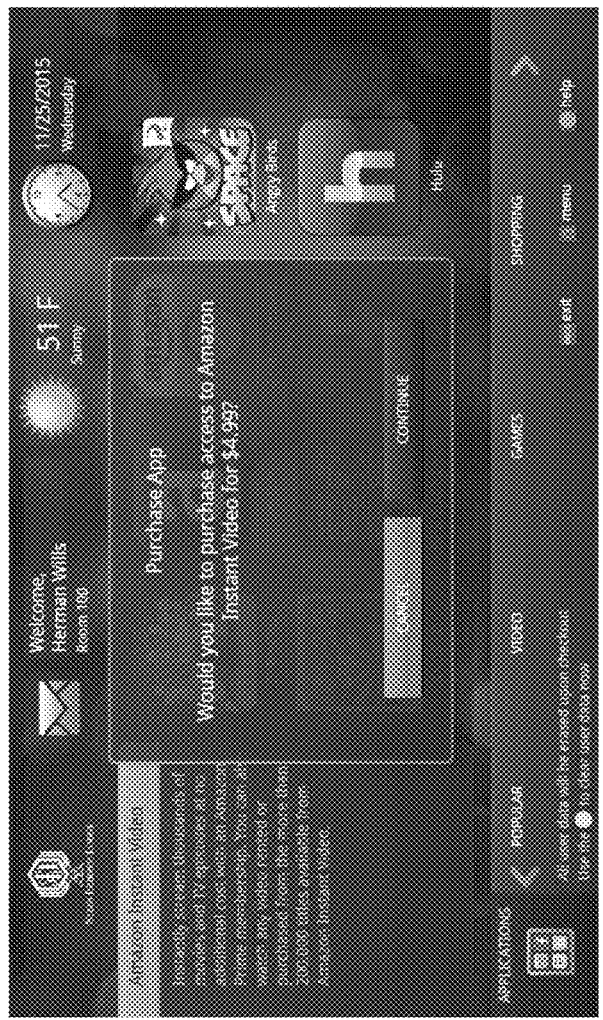
Figure 6K:
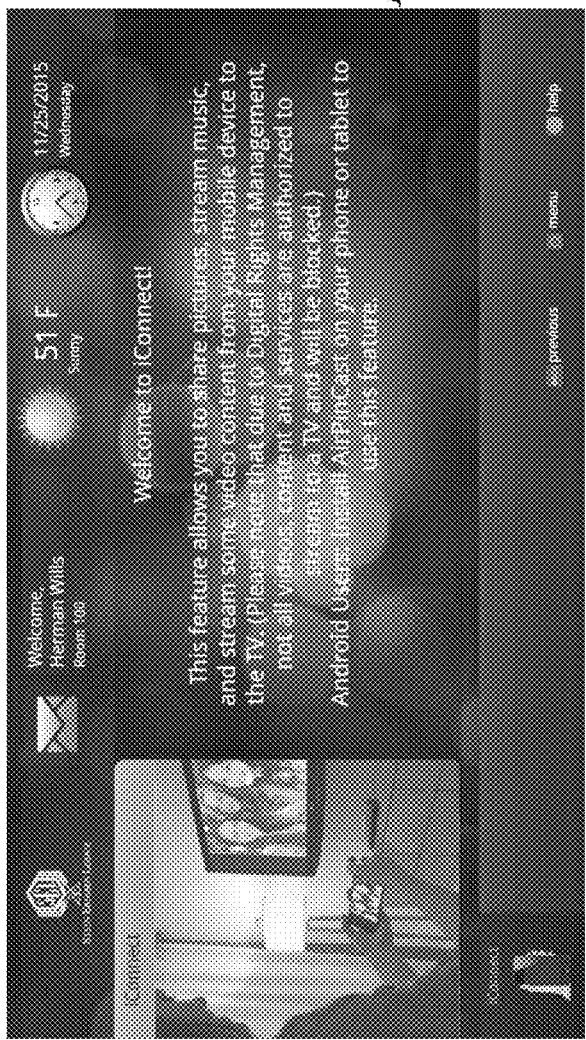
Figure 6L:
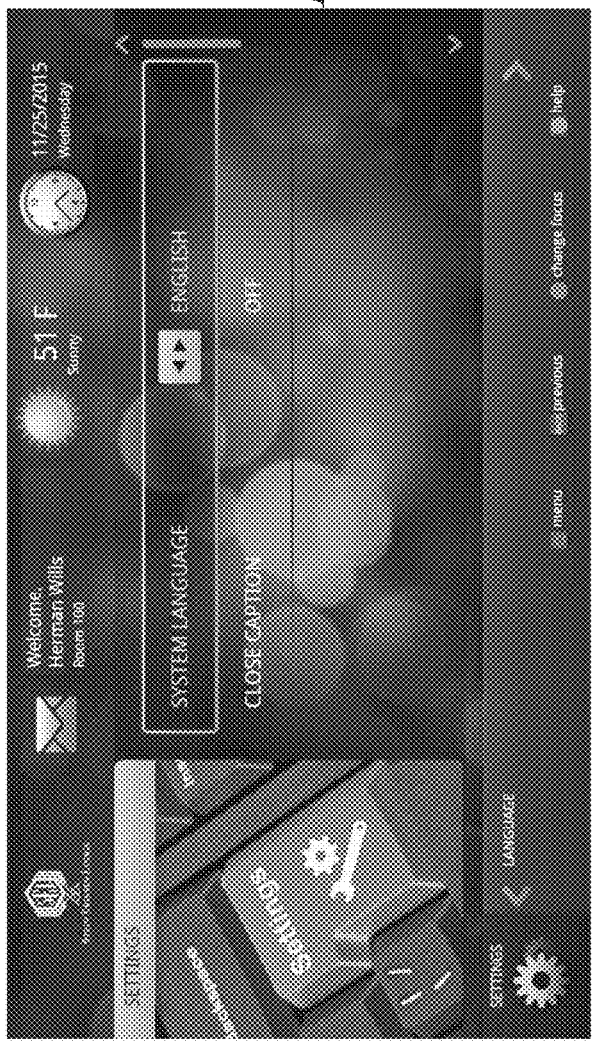
Figure 6M:
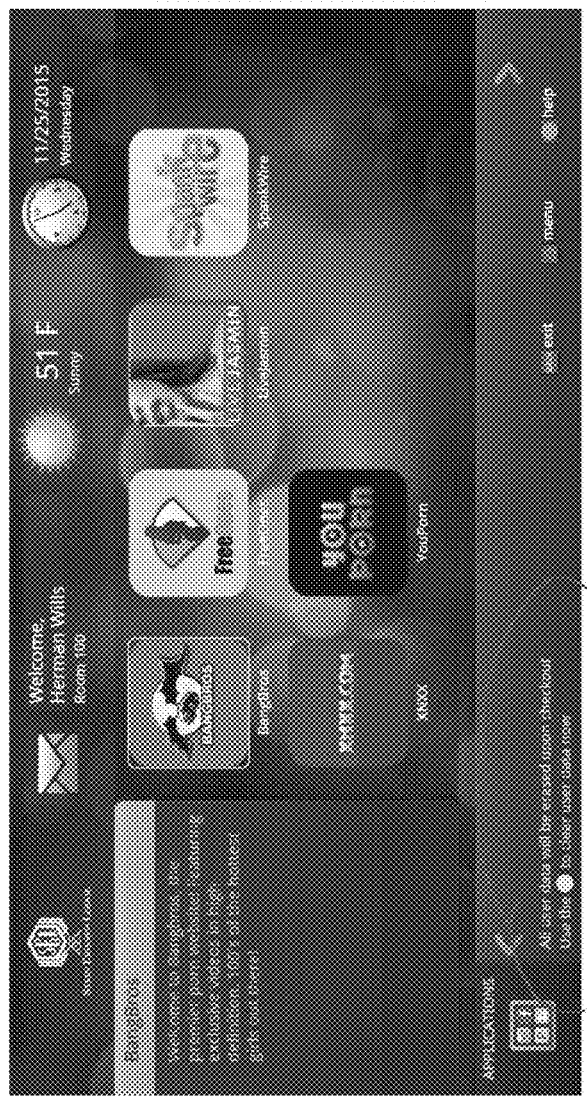

FIGS. 6A-6M are screenshots of a display on which a user interface of the set top box is displayed. The screenshot shown in FIG. 6A is a welcome screen introducing the content delivery service provided by the cloud management system via the set top box. The screenshot shown in FIG. 6B illustrates a request to purchase service to web access via the set top box. The guest may request to purchase web access via the set top box. The screenshots shown in FIGS. 6C-6D illustrate web services to which the guest purchased access in FIG. 6B. The screenshots shown in FIGS. 6E-6F enable a guest to set up a personal identification number. The screenshots shown in FIGS. 6G-6J enable a guest to access one or more applications via the set top box. The screenshot shown in FIG. 6K enables a guest to access a feature that allows the guest to share pictures, stream music and stream some video content from the guest's mobile device to the television. The screenshot shown in FIG. 6L enables a guest to adjust the settings of the set top box. These settings may be saved in a profile database of the cloud management system such that when the guest accesses another set top box, the settings of the other set top box can match the settings that the guest previously set on previous set top boxes accessed by the guest. The screenshot shown in FIG. 6M includes an instruction that allows the guest to erase data from the set top box. In some implementations, the guest can press a particular button on the input device of the set top box to cause the set top box to erase all of the history and cached files stored on the set top box. In some implementations, the set top box can be configured to allocate storage locations to which all of the guest's activity is stored. In this way, the set top box can erase the contents of the storage locations to which the guest's activity is stored with the press of a button on the input device of the set top box.

Figure 7:
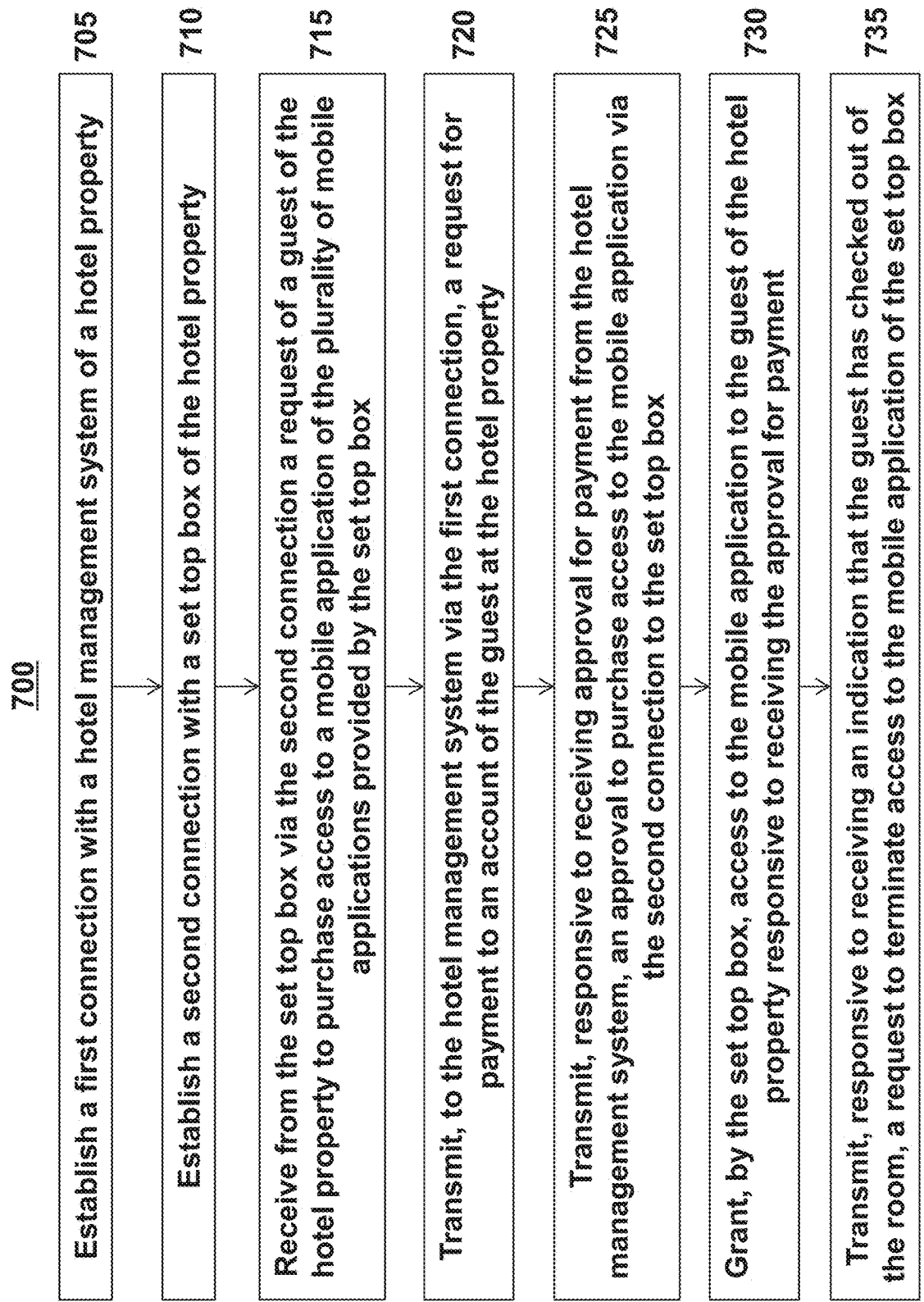
FIG. 7 is a flow chart of a process for authenticating and providing application access via a hotel management system.

Referring now to FIG. 7, FIG. 7 is a flow chart of a process 700 for authenticating and providing application access via a hotel management system. In brief overview, a cloud management system that is intermediary to a plurality of set top boxes located in rooms of a hotel property and a hotel management system of the hotel property can establish a first connection with the hotel management system of the hotel property (Block 705). The cloud management system can establish a second connection with a set top box of the hotel property (BLOCK 710). The cloud management system can receive, from the set top box via the second connection a request of a guest of the hotel property to purchase access to an application of the plurality of applications provided by the set top box (BLOCK 715). The cloud management system can transmit, to the hotel management system via the first connection a request for payment to an account of the guest at the hotel property (BLOCK 720). The cloud management system can transmit, responsive to receiving approval for payment from the hotel management system, an approval to purchase access to the application via the second connection to the set top box (BLOCK 725). In some implementations, the set top box can grant access to the application to the guest of the hotel property responsive to receiving the approval for payment (BLOCK 730). In some implementations, the cloud management system can transmit, responsive to receiving an indication that the guest has checked out of the room, a request to terminate access to the mobile application of the set top box (BLOCK 735).

In further detail, the cloud management system that is intermediary to a plurality of set top boxes located in rooms of a hotel property and a hotel management system of the hotel property can establish a first connection with the hotel management system of the hotel property (Block 705). The cloud management system can be configured to communicate with one or more hotel management systems of hotel properties located at disparate locations. The cloud management system can be configured to establish a connection with the hotel management system. In some implementations, the hotel management system may establish a connection with the cloud management system. In some implementations, the cloud management system and the hotel management system may establish a connection with one another. The cloud management system can execute on a server. The server can be configured to connect to a network, such as the Internet, via which the cloud management system can establish a connection with the hotel management system.

The cloud management system can be provided access to one or more data structures maintained by the hotel management system. In some implementations, the hotel management system can update the one or more data structures and responsive to updating the data structures, the hotel management system can send a request to the cloud management system indicating an update to the one or more data structures. In some implementations, the hotel management system can be configured to update a reservations data structure when a guest checks into the hotel. The reservations data structure can be updated to identify a room to which the guest is assigned and a set top box identifier identifying a set top box located in the room. The cloud management system can receive this information regarding a guest checking into the hotel and being assigned a room from the hotel management system. In some implementations, the cloud management system can receive a request from the hotel management system indicating that a guest has checked into the hotel.

In some implementations, the cloud management system can receive a request to assign a set top box to an account of the guest. The cloud management system can then assign the set top box corresponding to the room to the account of the guest. In some implementations, the cloud management system can transmit data corresponding to the account of the guest maintained by the hotel management system to the set top box responsive to assigning the set top box corresponding to the room to the account of the guest.

The cloud management system can establish a second connection with a set top box of the hotel property (BLOCK 710). In some implementations, the cloud management system and the set top box to which the guest that checked in is assigned can establish a second connection. The second connection can be established over a network, such as the Internet. In some implementations, the second connection can be established over the Internet and a local network In some implementations, the cloud management system can identify, from the request received from the hotel management system, a set top box identifier identifying the set top box corresponding to the room to which the guest is checked in to. The cloud management system can then send a request to the set top box via the second connection to configure the set top box. The request can include reservation related information that the set top box can use to configure the set top box to include information regarding the guest and the reservation.

The cloud management system can receive, from the set top box via the second connection a request of a guest of the hotel property to purchase access to an application of the plurality of applications provided by the set top box (BLOCK 715). The request to purchase access to an application provided by the set top box can include information identifying the set top box, the guest, payment information for the purchase, an application identifier identifying the application, one or more parameters regarding the access. Examples of parameters can include an amount of data that can be received or streamed via the application, an amount of time for which to purchase the access to the application. The set top box can be configured to generate a request to purchase access responsive to a guest interacting with the set top box via an input device. In some implementations, the guest can request to purchase access to a content stream application, such as NETFLIX, HULU, AMAZON VIDEO, among others. The guest can request to purchase access by clicking on an icon representing one of these applications. Responsive to clicking on the icon, the set top box can be configured to display, on the display device coupled to the set top box, a purchase order prompt requesting the user to confirm that they would like to purchase access to the application. The purchase order prompt can identify a purchase price. Responsive to the user confirming the purchase, the set top box can transmit a request to the cloud management system to purchase access to the application.

In some implementations, the set top box can be configured to have one or more applications installed on the set top box. The applications however may be inaccessible to the guest until the guest purchases access. In some implementations, the set top box can prevent access to the application until receipt of approval for payment from the hotel management system. In some implementations, the applications may be encrypted or stored in a particular folder of the set top box that cannot be accessed until an authorization code issued from the hotel management system is not inserted. In some implementations, the set top box may hide the application from view until the authorization code or other approval is not issued by the hotel management system.

The cloud management system can transmit, to the hotel management system via the first connection, a request for payment to an account of the guest at the hotel property (BLOCK 720). The cloud management system can parse the request received from the set top box and generate a request for payment. The cloud management system can transmit the request for payment to the hotel management system. The request for payment can identify the set top box from which the request was received along with additional information that may be used by the hotel management system to verify that the guest assigned to the set top box requested to purchase access.

The cloud management system can then receive a request from the hotel management system indicating that the hotel management system has approved the request for payment. In some implementations, the payment can be approved responsive to determining that the guest requested the purchase. In some implementations, the hotel management system may apply a charge to the reservation of the guest that the guest may pay at the time of checkout.

The cloud management system can transmit, responsive to receiving approval for payment from the hotel management system, an approval to purchase access to the application via the second connection to the set top box (BLOCK 725). In some implementations, the cloud management system can generate an approval request indicating approval to purchase access to the application. The approval request can then be transmitted by the cloud management system to the set top box for delivery. The approval request can include a script, code, instructions or other information that the set top box can use to configure the set top box to enable the guest to access the application as well as to request content via the application.

In some implementations, the set top box can grant access to the application to the guest of the hotel property responsive to receiving the approval for payment (BLOCK 730). The set top box can be configured to analyze the approval request. In some implementations, the approval request can include instructions, data or other information that the set top box can use to enable the guest to access the application as well as to request content via the application. In some implementations, the set top box can be configured to modify permissions associated with the application to enable the guest to access the application. Once the application is accessible to the guest, the guest can access content via the application and can stream or request content via the set top box, which can receive the content via a network that is unavailable or otherwise restricts other devices of the guest. In some implementations, the set top box can be configured to enable the set top box to establish a connection with a server of the application and receive, via the connection with the server, content to be displayed on a display device coupled to the set top box.

In some implementations, the set top box can be configured to be paired with a device of the guest. In some implementations, the set top box can establish a third connection with a mobile device of the guest. For instance, the set top box can be paired or communicatively coupled to a laptop, mobile phone or tablet of the guest. The set top box can be configured to include a screen mirroring application or other display application that enable s the set top box to display content on a display device or component of the guest. In some implementations, the mobile device can include a corresponding application configured to provide an interface to communicate with the set top box. In some implementations, the set top box can launch the application to be displayed on the guest's mobile device. In some implementations, the set top box can transmit content for display on a display of the mobile device via the application installed on the mobile device that enables the mobile device to communicate with the set top box.

In some implementations, the cloud management system can transmit, responsive to receiving an indication that the guest has checked out of the room, a request to terminate access to the application of the set top box (BLOCK 735). When a guest checks out of the hotel, the hotel management system can be updated to indicate that the guest has checked out. The hotel management system can update a reservations database indicating that the guest has checked out. As part of the checkout process, the hotel management system can generate a notification to the cloud management system indicating that the guest has checked out. The cloud management system can generate a request to terminate access to the application s of the set top box for which the guest previously purchased access. The cloud management system can transmit the request to terminate access to the set top box via the second connection. The set top box can receive the request to terminate access and be configured to execute a reset routine. The reset routine executing on the set top box can cause the set top box to erase all content pertaining to the guest from one or more storage locations of the set top box. In some implementations, the set top box can erase all login credentials, history, browsing data, content that was cached, among others. In addition, the set top box can be configured to be restored to a default setting state. In some implementations, applications that the guest had purchased access to may also no longer be available to access until a subsequent request to purchase access is approved.

C. Automatically Erasing Content Stored on a Set Top Box.

Hotels take great measures to maintain the privacy of their guests. One of the challenges of deploying set top boxes capable of allowing guests to access applications as well as access content via the set top box relates to privacy. Most devices, including set top boxes, store data relating to previous activity performed by the devices. For instance, a laptop can include one or more applications including a web browser. As a user of the laptop surfs the web, the web browser maintains a log of the websites the user visits, the login credentials the user provides to one or more websites, among others. A guest of a hotel can expect that their activities via the set top box located in their room to remain private. Furthermore, the guest may desire to be able to erase information relating to activities of the guest via the set top box on demand or at the minimum, at the time the guest checks out of the hotel.

Aspects of the present disclosure relate to methods and systems for automatically erasing content stored on a set top box. In some implementations, the content stored on the set top box can be erased responsive to an input received on a remote device. In some implementations, the content stored on the set top box can be erased responsive to a guest checking out of the room in which the set top box is located.

Referring again to FIG. 2A, the set top box 210 can be coupled to a display device on which the set top box can display content to the guest. In some implementations, the content can be tailored for the guest. In some implementations, when the guest checks into a hotel and is assigned a room, the hotel management system 202 can identify a set top box equipped for the room to which the guest is assigned and can cause the set top box to be configured with reservation information of the guest. In this way, when the guest accesses the set top box, the set top box can cause the display device to display content relevant to the guest. In some implementations, the hotel management system 202 can send a request to activate the set top box 210. In some implementations, the set top box 210 can receive the request to activate the set top box via the cloud management system 120.

During the course of the guest's stay, the guest can access the set top box 210 and may request to purchase access to one or more applications. In addition, the guest may request one or more services provided by the hotel via the set top box 210. For instance, the guest may request to watch a movie via a video on demand service of the hotel. The guest may also order food or housekeeping services, amongst others, via the set top box 210.

The set top box 210 can monitor and store the activity of the guest based on the requests the guest made via the set top box 210. In some implementations, the set top box can be configured to create a storage location in a memory of the set top box in which the set top box can store this activity. In some implementations, the set top box can be configured to store data relating to any services the guest ordered in the storage location. In addition, the set top box can be configured to store any data relating to web browsing activity performed by the guest via the set top box or a browser installed on the set top box in the storage location. The data relating to web browsing activity can include a history of the pages visited or requested, one or more search queries or entries typed in input fields, browsing data cached by a cache of the web browser, among others. The set top box can also store login credentials of one or more applications installed on the set top box that are provided by the guest. In some implementations, the storage locations created by the set top box at which to store the data generated from usage of the set top box by the guest can be configured to maintain separate folders for the different types of data collected by the set top box. For instance, the storage location can maintain one or more separate folders for each application. For instance, a browser can include a history folder maintaining the history of the pages visited via the browser, a cache folder storing content objects displayed by the browser, a login credentials folder that can store login credentials, a cookies folder that can store one or more cookies, among others. Similarly, the set top box can be configured such that different applications installed on the set top box can also be configured to store any guest activity related data in different application specific folders, locations, or objects within the storage location identified by the set top box for storing guest related activity.

As described above with respect to Section B, the set top box 210 can include the reset manager 216. The reset manager 216 can comprise components, subsystems, modules, scripts or one or more sets of computer-executable instructions and can be configured to reset the set top box. In some implementations, the set top box can be reset by executing one or more instructions on the set top box that cause the set top box to return to default settings. In addition, the instructions can cause the set top box to erase all data that is stored on the set top box that is generated based on activity of the guest. This can include any of the data stored responsive to the guest accessing one or more applications, browsers, hotel services, video on demand services, among others via the set top box.

The reset manager 216 can be configured to detect a reset request. In some implementations, the reset manager 216 can receive a reset request from an input device that is remote to the set top box. The input device can be a remote control or a device of the guest that is communicatively coupled to the set top box. In some implementations, the remote control, such as the remote control shown in FIGS. 3A-3C can include a dedicated reset button. In some implementations, the reset button can be a delete button. The reset button can be a dedicated button the input device, which when pressed or otherwise interacted, can cause the remote control to transmit a reset request to the set top box. In some implementations, a device of the guest can be configured or can be installed with an application that includes a user interface through which the guest can transmit a reset request.

In some implementations, the reset manager can be configured to receive a reset request from the hotel management system 202 or the server 106 executing the cloud management system 120. In some implementations, when a guest checks out of the hotel, the hotel management system 202 can send a notification to one of the cloud management system 120 or the set top box 210 that the guest has checked out. In some implementations, the notification sent to the set top box 210 can be in the form of a reset request. In some implementations, the cloud management system 120, responsive to receiving the notification from the hotel management system 202, can generate and transmit a reset request to the set top box 210.

The reset manager 216 can be configured to execute the reset request. In some implementations, to execute the reset request, the reset manager 216 can identify the storage location at which the guest related activity is stored. The reset manager 216 can then cause the set top box to uninstall all of the applications installed on the set top box after the set top box was assigned to the guest. The reset manager 216 can then cause the set top box to delete or erase all files, data, or content stored at the identified storage location after the set top box was assigned to the guest. In some implementations, the reset manager 216 may permanently delete or erase the all files, data, or content stored at the identified storage location after the set top box was assigned to the guest. After the reset manager 216 deletes all of the content, the reset manager 216 can be configured to restore the set top box to default settings such that the set top box is ready to receive a request to configure the set top box for the next guest that is assigned to the room for which the set top box is located.

Figure 8:
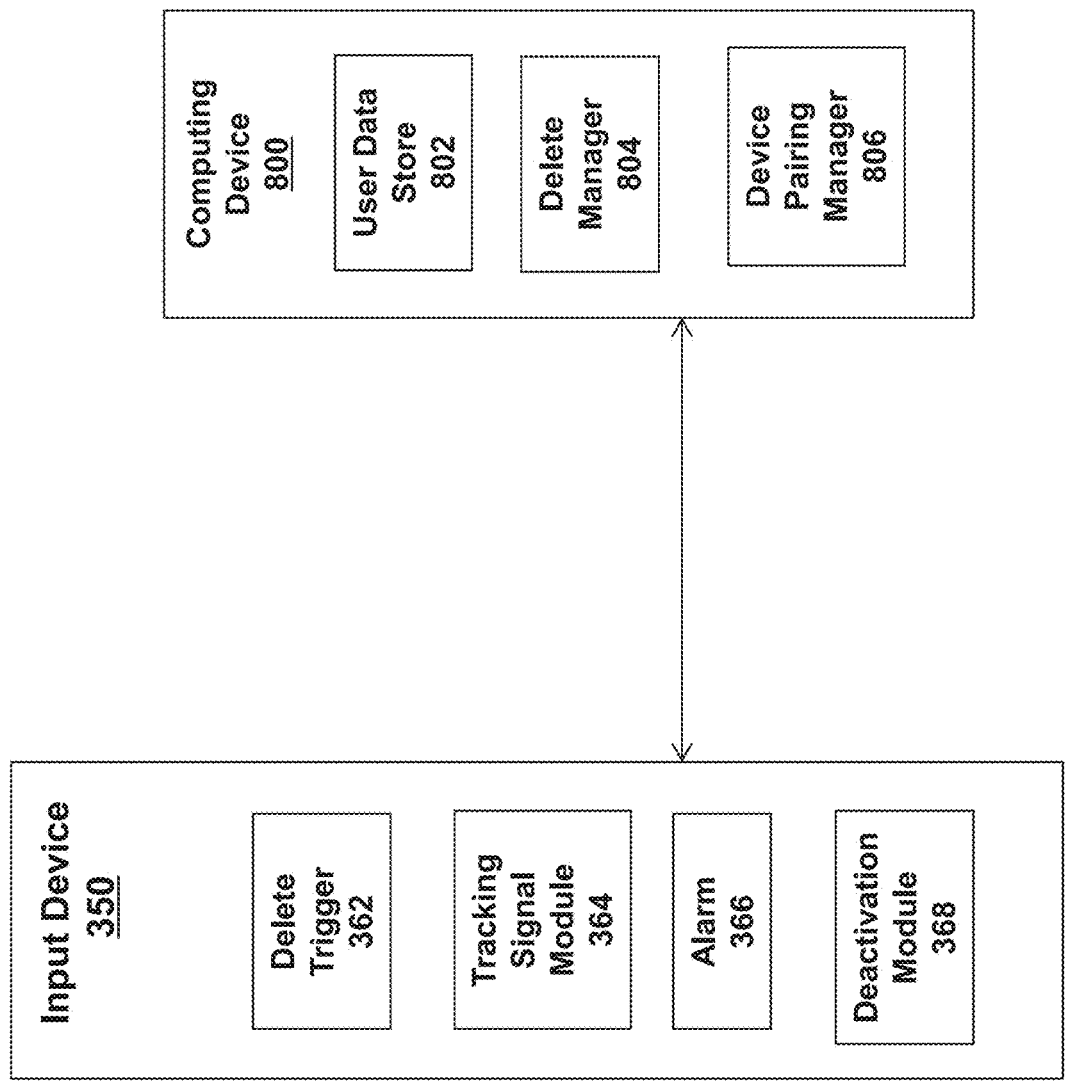
FIG. 8 is a flow chart of a process for erasing content stored on a set top box via a dedicated input object of a remote input device.

Referring now to FIG. 8, FIG. 8 is a flow chart of a process for automatically erasing content stored on a set top box via a dedicated input object of a remote input device. In brief overview, a set top box receives a request to activate the set top box (BLOCK 805). The set top box can create a storage location to which the set top box is configured to store identifiers and passwords of a guest (BLOCK 810). The set top box can store one or more user identifiers and passwords of the guest that correspond to one of one or more applications or web services accessed via the device (BLOCK 815). The set top box can receive, from a remote control device via a wireless communication, a command to delete the user identifiers and passwords stored on the set top box responsive to selection of a delete button on the remote control device (BLOCK 820). An agent executing on the set top box can delete the one or more user identifiers and passwords from the set top box responsive to receipt of the command. (BLOCK 825).

In further detail, the set top box receives a request to activate the set top box (BLOCK 805). In some implementations, the device is a set top box connected to a viewing device in a hotel property. In some implementations, the set top box can be activated responsive to a guest being assigned to a room in which the set top box is located. In some implementations, when the guest checks into a hotel and is assigned a room, the hotel management system 202 can identify a set top box located in the room to which the guest is assigned and can cause the set top box to be configured with reservation information of the guest. In this way, when the guest accesses the set top box, the set top box can cause the display device to display content relevant to the guest In some implementations, the hotel management system 202 can send a request to activate the set top box 210. In some implementations, the set top box 210 can receive the request to activate the set top box via the cloud management system 120. In some implementations, the set top box can be configured to receive the request to activate the device from the cloud management system that receives communications from the hotel management system. The request to activate the device can be transmitted by the cloud management system responsive to the hotel management system assigning the user to a room corresponding to the device.

The set top box can create a storage location to which the set top box is configured to store identifiers and passwords of a guest (BLOCK 810). The set top box can be configured to activate responsive to receiving the request to activate. The set top box can be activated by performing an initialization routine. Part of that initialization routine includes identifying the reservation information included in the request to activate the set top box and generating a user interface that is customized based on the reservation, the guest and the guest's preferences. Another part of the initialization routine can include creating a storage location in memory of the set top box where data relating to activities performed by the guest after the set top box has been activated is stored.

The set top box can store one or more user identifiers and passwords of the guest that correspond to one of one or more applications or web services accessed via the device (BLOCK 815). In some implementations, the device can store a user's activity via one of a browser or a web service via the device. In some implementations, the set top box can store data relating to any services the guest ordered in the storage location. In addition, the set top box can store any data relating to web browsing activity performed by the guest via the set top box or a browser installed on the set top box in the storage location. The data relating to web browsing activity can include a history of the pages visited or requested, one or more search queries or entries typed in input fields, browsing data cached by a cache of the web browser, among others. The set top box can also store login credentials of one or more applications installed on the set top box that are provided by the guest. In some implementations, the storage locations created by the set top box at which to store the data generated from usage of the set top box by the guest can be configured to maintain separate folders for the different types of data collected by the set top box. For instance, the storage location can maintain one or more separate folders for each application. For instance, a browser can include a history folder maintaining the history of the pages visited via the browser, a cache folder storing content objects displayed by the browser, a login credentials folder that can store login credentials, a cookies folder that can store one or more cookies, among others. Similarly, the set top box can be configured such that different applications installed on the set top box can also be configured to store any guest activity related data in different application specific folders, locations, or objects within the storage location identified by the set top box for storing guest related activity.

The set top box can receive, from a remote control device via a wireless communication, a command to delete the user identifiers and passwords stored on the set top box responsive to selection of a delete button on the remote control device (BLOCK 820). In some implementations, the reset manager of the set top box can receive a reset request from an input device that is remote to the set top box. The reset request can include a request to delete the user identifiers and passwords stored on the set top box. The input device can be a remote control or a device of the guest that is communicatively coupled to the set top box. In some implementations, the remote control, such as the remote control shown in FIGS. 3A-3C can include a dedicated reset button. In some implementations, the reset button can be a delete button. The reset button can be a dedicated button the input device, which when pressed or otherwise interacted, can cause the remote control to transmit a reset request to the set top box. In some implementations, a device of the guest can be configured or can be installed with an application that includes a user interface through which the guest can transmit a reset request. In some implementations, the guest may be required to enter a passcode or other identifying information to confirm that the guest is requesting to transmit the reset request.

The agent executing on the set top box can delete the one or more user identifiers and passwords from the set top box responsive to receipt of the command. (BLOCK 825). In some implementations, the agent of the set top box, for instance, the reset manager of the set top box can reset the set top box. In some implementations, the reset manager executing on the set top box can cause the set top box to return to default settings. In addition, the reset manager executing on the set top box can cause the set top box to erase all data that is stored on the set top box that is generated based on activity of the guest. This can include any of the data stored responsive to the guest accessing one or more applications, browsers, hotel services, video on demand services, among others via the set top box. In addition, this can include deleting the one or more user identifiers and passwords from the set top box. In some implementations, the reset manager can identify one or more storage locations to which the set top box is configured to store the one or more user identifiers and passwords. The reset manager can then delete the one or more user identifiers and passwords from the identified one or more storage locations. In some implementations, the set top box can uninstall the one or more applications or web services accessed via the set top box.

Figure 9:
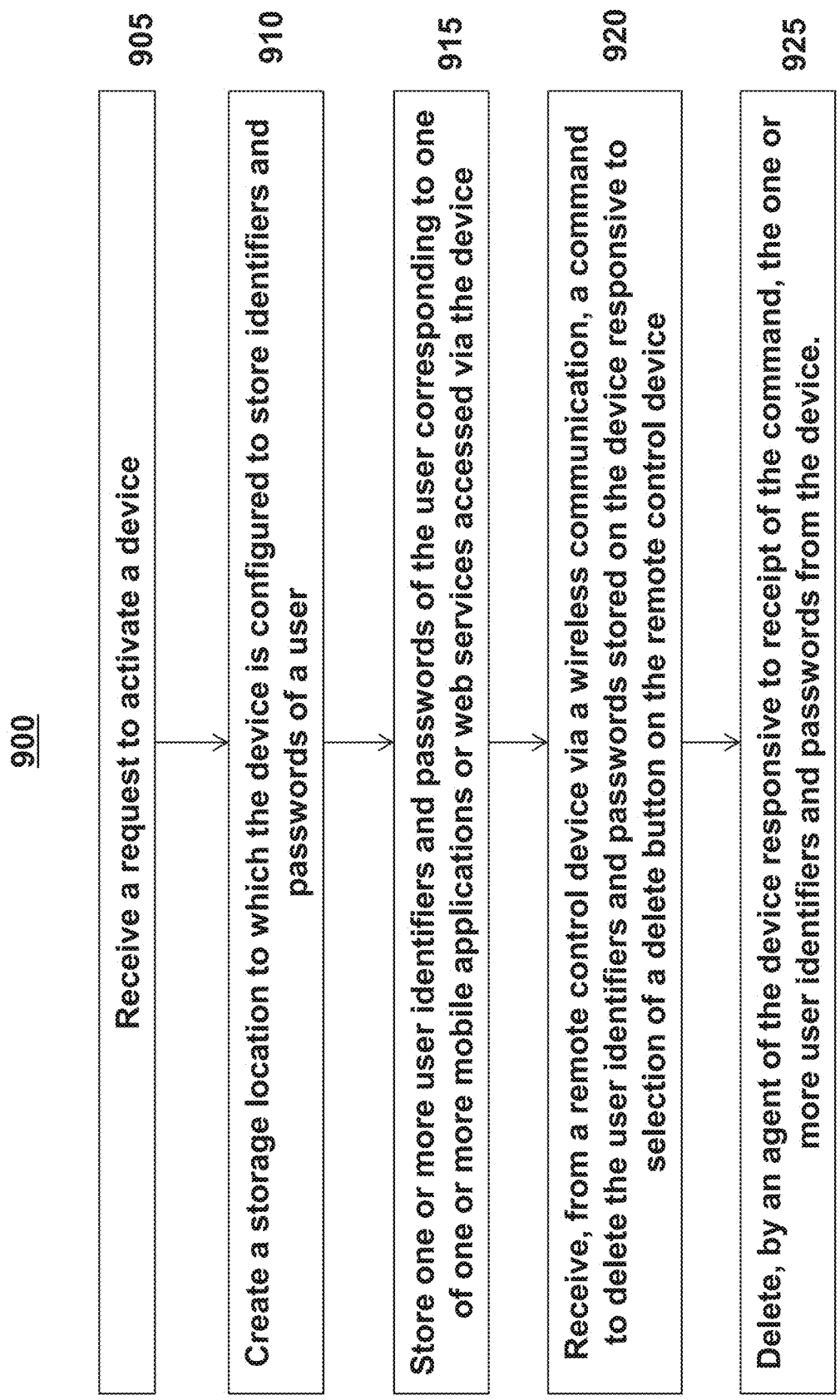
FIG. 9 is a flow chart of a process for automatically erasing content stored on a remote set top box via a hotel management system.
Figure 10:
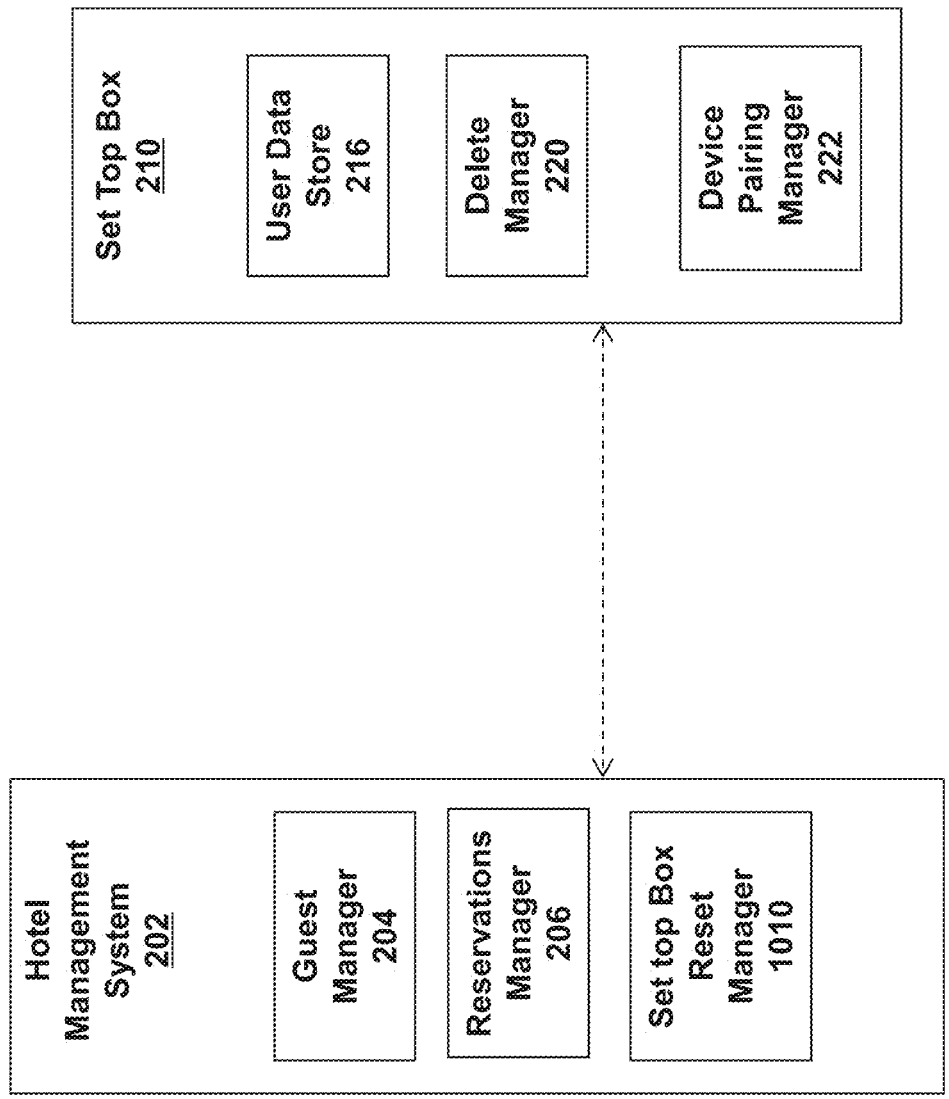
FIG. 10 illustrates a block diagram of a system for automatically erasing content stored on a remote set top box via a hotel management system.

FIG. 9 is a flow chart of a process for automatically erasing content stored on a remote set top box via a hotel management system. In brief overview, a set top box receives a request to activate the set top box (BLOCK 905). The set top box can create a storage location to which the set top box is configured to store identifiers and passwords of a guest (BLOCK 910). The set top box can store one or more user identifiers and passwords of the guest that correspond to one of one or more applications or web services accessed via the set top box (BLOCK 915). The set top box can receive a communication identifying that the guest of the hotel property corresponding to the set top box has checked out from the hotel property (BLOCK 920). An agent of the set top box can then delete the one or more user identifiers and passwords of the guest from the set top box responsive to receipt of the communication (BLOCK 925).

In further detail, the set top box receives a request to activate the set top box (BLOCK 905). In some implementations, the device is a set top box connected to a viewing device in a hotel property. In some implementations, the set top box can be activated responsive to a guest being assigned to a room in which the set top box is located. In some implementations, when the guest checks into a hotel and is assigned a room, the hotel management system 202 can identify a set top box located in the room to which the guest is assigned and can cause the set top box to be configured with reservation information of the guest. In this way, when the guest accesses the set top box, the set top box can cause the display device to display content relevant to the guest In some implementations, the hotel management system 202 can send a request to activate the set top box 210. In some implementations, the set top box 210 can receive the request to activate the set top box via the cloud management system 120. In some implementations, the set top box can be configured to receive the request to activate the device from the cloud management system that receives communications from the hotel management system. The request to activate the device can be transmitted by the cloud management system responsive to the hotel management system assigning the user to a room corresponding to the device.

The set top box can create a storage location to which the set top box is configured to store identifiers and passwords of a guest (BLOCK 910). The set top box can be configured to activate responsive to receiving the request to activate. The set top box can be activated by performing an initialization routine. Part of that initialization routine includes identifying the reservation information included in the request to activate the set top box and generating a user interface that is customized based on the reservation, the guest and the guest's preferences. Another part of the initialization routine can include creating a storage location in memory of the set top box where data relating to activities performed by the guest after the set top box has been activated is stored.

The set top box can store one or more user identifiers and passwords of the guest that correspond to one of one or more applications or web services accessed via the device (BLOCK 915). In some implementations, the device can store a user's activity via one of a browser or a web service via the device. In some implementations, the set top box can store data relating to any services the guest ordered in the storage location. In addition, the set top box can store any data relating to web browsing activity performed by the guest via the set top box or a browser installed on the set top box in the storage location. The data relating to web browsing activity can include a history of the pages visited or requested, one or more search queries or entries typed in input fields, browsing data cached by a cache of the web browser, among others. The set top box can also store login credentials of one or more applications installed on the set top box that are provided by the guest. In some implementations, the storage locations created by the set top box at which to store the data generated from usage of the set top box by the guest can be configured to maintain separate folders for the different types of data collected by the set top box. For instance, the storage location can maintain one or more separate folders for each application. For instance, a browser can include a history folder maintaining the history of the pages visited via the browser, a cache folder storing content objects displayed by the browser, a login credentials folder that can store login credentials, a cookies folder that can store one or more cookies, among others. Similarly, the set top box can be configured such that different applications installed on the set top box can also be configured to store any guest activity related data in different application specific folders, locations, or objects within the storage location identified by the set top box for storing guest related activity.

The set top box can receive a communication identifying that the guest of the hotel property corresponding to the set top box has checked out from the hotel property (BLOCK 920). In some implementations, the set top box can receive a communication, such as a reset request, from the hotel management system 202 or the server 106 executing the cloud management system 120. In some implementations, when a guest checks out of the hotel, the hotel management system 202 can send a notification to one of the cloud management system 120 or the set top box 210 that the guest has checked out. In some implementations, the notification sent to the set top box 210 can be in the form of a reset request. In some implementations, the cloud management system 120, responsive to receiving the notification from the hotel management system 202, can generate and transmit a reset request to the set top box 210.

The agent executing on the set top box can delete the one or more user identifiers and passwords from the set top box responsive to receipt of the communication. (BLOCK 825). In some implementations, the agent of the set top box, for instance, the reset manager of the set top box can reset the set top box. In some implementations, the reset manager executing on the set top box can cause the set top box to return to default settings. In addition, the reset manager executing on the set top box can cause the set top box to erase all data that is stored on the set top box that is generated based on activity of the guest. This can include any of the data stored responsive to the guest accessing one or more applications, browsers, hotel services, video on demand services, among others via the set top box. In addition, this can include deleting the one or more user identifiers and passwords from the set top box. In some implementations, the reset manager can identify one or more storage locations to which the set top box is configured to store the one or more user identifiers and passwords. The reset manager can then delete the one or more user identifiers and passwords from the identified one or more storage locations. In some implementations, the set top box can uninstall the one or more applications or web services accessed via the set top box.

It should be appreciated that although the specification and claims refer to hotels, the application is not limited to hotels. Rather, the scope of the application may extend to other properties in which set top boxes are deployed. It should be appreciated that the scope of the application extends to hospitals, airports, aircrafts, trains, other vehicles, and other premises where internet connectivity and bandwidth is limited or restricted. Further, although the specification and claims refer to set top boxes, the set top boxes can be any device that enables users to access content or applications via a network that devices of the user are unauthorized to user or have restricted access.

The invention claimed is:

1. A method comprising:
    receiving, by a device coupled to a display device and configured to act as a set-top box, authorization information from a cloud management system responsive to the cloud management system receiving a communication from a reservation system authorizing access to one or more applications, wherein the reservation system validated a user assigned to a room of the device, wherein the device prevents access via one or more user devices of the user to the one or more applications to which the user has an account accessible by a user identifier and password until the device receives authorization from the reservation system via the cloud management service, wherein the authorization information is used by the device to access content via the one or more applications;
    receiving, by the device, a first request to access a first application of the one or more applications via the device;
    receiving, by the device, one or more user identifiers and passwords of the user corresponding to at least the first application accessed via the device, the device storing the one or more user identifiers and passwords;
    transmitting, by the device based at least on the first request and enabling access responsive to receiving authorization from the reservation system via the cloud management service, content of the first application to a user device of the one or more user devices for display on the user device instead of or in addition to displaying the content on the display device coupled to the device;
    receiving, by the device, a delete request to delete any user identifiers and passwords of the user stored on the device; and
    deleting, by the device responsive to the delete request, at least the one or more user identifiers and passwords stored on the device.

2. The method of claim 1, further comprises transmitting, by the device, to the cloud management system, a second request for authorization to provide access to the user to the first application via the device; and receiving, by the device responsive to the second request, authorization from the cloud management system, the cloud management system providing the response responsive to the reservation system authorizing access by the user to the first application via the device.

3. The method of claim 1, wherein the device is one of the set top box or a computing device.

4. The method of claim 1, wherein the device receives the delete request from second device comprising a remote control device, a computing device or one of the one or more user devices.

5. The method of claim 1, wherein the first application is one of a web service, a web application accessed via a browser or a third party application subscribed to by the user.

6. The method of claim 1, further comprising receiving, by the device, the first request via one of the one or more user devices, wherein the one or more devices have an application installed that enables the one or more user devices to communicate with the device.

7. The method of claim 1, further comprising updating, by the device, responsive to deleting the one or more user identifiers and passwords of the user from the device, settings of the device to enable the device to store a second one or more user identifiers and passwords of a second user.

8. The method of claim 1, further comprising identifying, by the device, the reservation information of the user and providing a user interface accessible via the device configured for the user based on the reservation information.

9. The method of claim 1, further comprising storing, by the device, a cache or a history of the user's activity with the first application via the device.

10. The method of claim 9, further comprising deleting, by the device responsive to the delete request, the cache or the history of the user's activity from the device.

11. A system comprising:
a device comprising one or more processors, coupled to memory and a display device and configured to act a set-top box and:
receive authorization information, by a cloud management system responsive to a communication from a reservation system authorizing access to one or more applications, wherein the reservation system validated a user assigned to a room of the device, wherein the device prevents access via one or more user devices of the user to the one or more applications to which the user has an account accessible by a user identifier and passwords until the device receives authorization from the reservation system via the cloud management service, wherein the authorization information is used by the device to access content via the one or more applications;
receive a first request to access a first application of the one or more applications via the device;
receive one or more user identifiers and passwords of the user corresponding to at least the first application accessed via the device, the device storing the one or more user identifiers and passwords;
transmit, based at least on the first request and enabling access responsive to receiving authorization from the reservation system via the cloud management service, content of the first application to a user device of the one or more user devices for display on the user device instead of or in addition to displaying the content on the display device coupled to the device;
receive a delete request to delete any user identifiers and passwords of the user stored on the device; and
delete, responsive to the delete request, at least the one or more user identifiers and passwords stored on the device.

12. The system of claim 11, wherein the device is further configured to transmit, to the cloud management system, a second request for authorization to provide access to the user to the first application via the device and receive, responsive to the second request, authorization from the cloud management system, the cloud management system providing the response responsive to the reservation system authorizing access by the user to the first application via the device.

13. The system of claim 11, wherein the device wherein the device is one of the set top box or a computing device.

14. The system of claim 11, wherein the device is further configured to receive the delete request from second device that comprises a remote control device, a computing device or one of the one or more user devices.

15. The system of claim 11, wherein the first application is one of a web service, a web application accessed via a browser or a third party application subscribed to by the user.

16. The system of claim 11, where the device is further configured to receive the first request via one of the one or more user devices, wherein the one or more devices have an application installed that enables the one or more user devices to communicate with the device.

17. The system of claim 11, wherein the device is further configured to update, responsive to deleting the one or more user identifiers and passwords of the user from the device, settings of the device to enable the device to store a second one or more user identifiers and passwords of a second user.

18. The system of claim 11, wherein the device is further configured to identify the reservation information of the user and providing a user interface accessible via the device configured for the user based on the reservation information.

19. The system of claim 11, wherein the device is further configured to store a cache or a history of the user's activity with the first application via the device.

20. The system of claim 19, wherein the device is further configured to delete, responsive to the delete request, the cache or the history of the user's activity from the device.

* * * * *